US012289269B2

United States Patent
Hao et al.

(10) Patent No.: US 12,289,269 B2
(45) Date of Patent: Apr. 29, 2025

(54) PORT SELECTION FOR CHANNEL STATE FEEDBACK WITH ANALOG FEEDFORWARD

(71) Applicant: QUALCOMM Incorporated, San Diego, CA (US)

(72) Inventors: Chenxi Hao, Beijing (CN); Liangming Wu, Beijing (CN); Yu Zhang, San Diego, CA (US); Chao Wei, Beijing (CN); Hao Xu, Beijing (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 447 days.

(21) Appl. No.: 17/754,719

(22) PCT Filed: Oct. 10, 2020

(86) PCT No.: PCT/CN2020/120104
§ 371 (c)(1),
(2) Date: Apr. 8, 2022

(87) PCT Pub. No.: WO2021/068915
PCT Pub. Date: Apr. 15, 2021

(65) Prior Publication Data
US 2023/0163911 A1 May 25, 2023

(51) Int. Cl.
*H04L 12/28* (2006.01)
*H04B 7/06* (2006.01)
*H04L 5/00* (2006.01)

(52) U.S. Cl.
CPC ......... *H04L 5/0051* (2013.01); *H04B 7/0626* (2013.01); *H04B 7/0639* (2013.01)

(58) Field of Classification Search
CPC ............. H04B 7/0626; H04B 7/0639
(Continued)

(56) References Cited

U.S. PATENT DOCUMENTS 9,673,945 B2    6/2017   Geirhofer et al.
9,872,242 B2    1/2018   Xiao et al.
(Continued)

FOREIGN PATENT DOCUMENTS

CN       107113040 A     8/2017
CN       108271265 A     7/2018
(Continued)

OTHER PUBLICATIONS

CN 108631847 , "Method for Transmitting cgannel state information, terminal equipment , and network equipment", pp. 1-26, Jul. 10, 2018, Huawei LTD.*
(Continued)

*Primary Examiner* — Dang T Ton
(74) *Attorney, Agent, or Firm* — QUALCOMM Incorporated

(57) ABSTRACT

Certain aspects of the present disclosure provide techniques for port selection for channel state feedback with analog feedforward. A method that may be performed by a user equipment (UE) includes selecting one or more channel state information reference signals (CSI-RS) ports, of a plurality of CSI-RS ports, for the UE to report CSI. The port selection includes selecting any of the plurality of CSI-RS ports for selecting CSI-RS based on a grouping of the plurality of CSI-RS ports. The UE determines a precoding matrix indicator (PMI) formed by a linear combination of the one or more selected CSI-RS ports. The UE computes at least wideband linear combination coefficients for the selected CSI-RS ports. The UE provides the selected one or more CSI-RS ports and the computed wideband linear combination coefficients to a base station (BS) in a CSI report.

35 Claims, 12 Drawing Sheets

(58) Field of Classification Search
USPC .................................... 370/329, 400, 401
See application file for complete search history.

(56) References Cited

U.S. PATENT DOCUMENTS

| | | | |
|---|---|---|---|
| 10,056,956 B2 | 8/2018 | Rahman et al. | |
| 2016/0119097 A1 | 4/2016 | Nam et al. | |
| 2016/0157218 A1* | 6/2016 | Nam | H04B 7/0632 370/329 |
| 2016/0337105 A1 | 11/2016 | Lawton et al. | |
| 2018/0323854 A1 | 11/2018 | Yang et al. | |
| 2019/0190578 A1 | 6/2019 | Mittal et al. | |
| 2023/0170963 A1* | 6/2023 | Wu | H04W 72/23 370/329 |

FOREIGN PATENT DOCUMENTS

| | | |
|---|---|---|
| CN | 108631847 A | 10/2018 |
| CN | 109302857 A | 2/2019 |
| WO | 2012112291 | 8/2012 |
| WO | 2015116619 A1 | 8/2015 |
| WO | 2018127044 A1 | 7/2018 |
| WO | 2018143667 A1 | 8/2018 |

OTHER PUBLICATIONS

Huawei et al., "Codebook Design for Beamformed CSI RS", 3rd Generation Partnership Project, Mobile Competence Centre, 650, Route Des Lucioles, F-06921 Sophia-Antipolis Cedex, France, XP051339188, R1-1715726, GPP TSG RAN WG1 Meeting NR#3, Sep. 18-21, 2017, 6 Pages, p. 1, lines line—p. 2 line 2, p. 2, sec 3, p. 2, first para, p. 3 sec 3.2, p. 3, last para, p. 4, first para, p. last 4 lines, p. 2, sec 2, first para, p. 3 Fig. 1 and the text below Fig. 2, sec 4, first para, p. 3 sec 3.2 second para.
Supplementary European Search Report—EP20874314—Search Authority—Munich—Sep. 20, 2023.
International Search Report and Written Opinion—PCT/CN2019/110286—ISA/EPO—Jul. 6, 2020.
International Search Report and Written Opinion—PCT/CN2020/120104—ISA/EPO—Dec. 30, 2020.
Qualcomm Incorporated: "CSI Enhancement for MU-MIMO Support," R1-1813441, 3GPP TSG RAN WG1 Meeting #95, Nov. 12-16, 2018, Spokane, U.S.A., Nov. 3, 2018, sections 1-7, 10 Pages.
Huawei, et al., "Codebook Design for Beamformed CSI RS", 3GPP TSG RAN WG1 Meeting NR#3, R1-1715726, Nagoya, Japan, Sep. 18-21, 2017, Sep. 21, 2017, 6 Pages.

* cited by examiner

Resource 0
FD Basis 0

FD Unit 0 to $N_3 - 1$

| Port | |
|---|---|
| Port 0 | $b_0 \cdot f_0^H[0] \cdots b_0 \cdot f_0^H[N_3 - 1]$ |
| Port 1 | $b_1 \cdot f_0^H[0] \cdots b_1 \cdot f_0^H[N_3 - 1]$ |
| Port 2 | $b_2 \cdot f_0^H[0] \cdots b_2 \cdot f_0^H[N_3 - 1]$ |
| Port 3 | $b_3 \cdot f_0^H[0] \cdots b_3 \cdot f_0^H[N_3 - 1]$ |
| Port 4 | $b_4 \cdot f_0^H[0] \cdots b_4 \cdot f_0^H[N_3 - 1]$ |
| Port 5 | $b_5 \cdot f_0^H[0] \cdots b_5 \cdot f_0^H[N_3 - 1]$ |
| Port 6 | $b_6 \cdot f_0^H[0] \cdots b_6 \cdot f_0^H[N_3 - 1]$ |
| Port 7 | $b_7 \cdot f_0^H[0] \cdots b_7 \cdot f_0^H[N_3 - 1]$ |
| Port 8 | $b_0 \cdot f_0^H[0] \cdots b_0 \cdot f_0^H[N_3 - 1]$ |
| ⋮ | |
| Port 15 | $b_7 \cdot f_0^H[0] \cdots b_7 \cdot f_0^H[N_3 - 1]$ |

1st Half for 1st Polarization (Ports 0–7)

2nd Half for 2nd Polarization with Port-Wise Same Precoder (Ports 8–15)

Resource 1
FD Basis 1

FD Unit 0 to $N_3 - 1$

| Port | |
|---|---|
| Port 0 | $b_0 \cdot f_1^H[0] \cdots b_0 \cdot f_1^H[N_3 - 1]$ |
| Port 1 | $b_1 \cdot f_1^H[0] \cdots b_1 \cdot f_1^H[N_3 - 1]$ |
| Port 2 | $b_2 \cdot f_1^H[0] \cdots b_2 \cdot f_1^H[N_3 - 1]$ |
| Port 3 | $b_3 \cdot f_1^H[0] \cdots b_3 \cdot f_1^H[N_3 - 1]$ |
| Port 4 | $b_4 \cdot f_1^H[0] \cdots b_4 \cdot f_1^H[N_3 - 1]$ |
| Port 5 | $b_5 \cdot f_1^H[0] \cdots b_5 \cdot f_1^H[N_3 - 1]$ |
| Port 6 | $b_6 \cdot f_1^H[0] \cdots b_6 \cdot f_1^H[N_3 - 1]$ |
| Port 7 | $b_7 \cdot f_1^H[0] \cdots b_7 \cdot f_1^H[N_3 - 1]$ |
| Port 8 | $b_0 \cdot f_1^H[0] \cdots b_0 \cdot f_1^H[N_3 - 1]$ |
| ⋮ | |
| Port 15 | $b_7 \cdot f_1^H[0] \cdots b_7 \cdot f_1^H[N_3 - 1]$ |

1st Half for 1st Polarization (Ports 0–7)

2nd Half for 2nd Polarization with Port-Wise Same Precoder (Ports 8–15)

FIG. 6A

Resource 2
FD Basis 2

FD Unit 0 to $N_3 - 1$

1st Half for 1st Polarization:
- Port 0: $b_0 \cdot f_2^H[0] \cdots b_0 \cdot f_2^H[N_3-1]$
- Port 1: $b_1 \cdot f_2^H[0] \cdots b_1 \cdot f_2^H[N_3-1]$
- Port 2: $b_2 \cdot f_2^H[0] \cdots b_2 \cdot f_2^H[N_3-1]$
- Port 3: $b_3 \cdot f_2^H[0] \cdots b_3 \cdot f_2^H[N_3-1]$
- Port 4: $b_4 \cdot f_2^H[0] \cdots b_4 \cdot f_2^H[N_3-1]$
- Port 5: $b_5 \cdot f_2^H[0] \cdots b_5 \cdot f_2^H[N_3-1]$
- Port 6: $b_6 \cdot f_2^H[0] \cdots b_6 \cdot f_2^H[N_3-1]$
- Port 7: $b_7 \cdot f_2^H[0] \cdots b_7 \cdot f_2^H[N_3-1]$ 2nd Half for 2nd Polarization with Port-Wise Same Precoder:
- Port 8: $b_0 \cdot f_2^H[0] \cdots b_0 \cdot f_2^H[N_3-1]$
- ⋮
- Port 15: $b_7 \cdot f_2^H[0] \cdots b_7 \cdot f_2^H[N_3-1]$

Resource 3
FD Basis 3

FD Unit 0 to $N_3 - 1$

1st Half for 1st Polarization:
- Port 0: $b_0 \cdot f_3^H[0] \cdots b_0 \cdot f_3^H[N_3-1]$
- Port 1: $b_1 \cdot f_3^H[0] \cdots b_1 \cdot f_3^H[N_3-1]$
- Port 2: $b_2 \cdot f_3^H[0] \cdots b_2 \cdot f_3^H[N_3-1]$
- Port 3: $b_3 \cdot f_3^H[0] \cdots b_3 \cdot f_3^H[N_3-1]$
- Port 4: $b_4 \cdot f_3^H[0] \cdots b_4 \cdot f_3^H[N_3-1]$
- Port 5: $b_5 \cdot f_3^H[0] \cdots b_5 \cdot f_3^H[N_3-1]$
- Port 6: $b_6 \cdot f_3^H[0] \cdots b_6 \cdot f_3^H[N_3-1]$
- Port 7: $b_7 \cdot f_3^H[0] \cdots b_7 \cdot f_3^H[N_3-1]$ 2nd Half for 2nd Polarization with Port-Wise Same Precoder:
- Port 8: $b_0 \cdot f_3^H[0] \cdots b_0 \cdot f_3^H[N_3-1]$
- ⋮
- Port 15: $b_7 \cdot f_3^H[0] \cdots b_7 \cdot f_3^H[N_3-1]$

FIG. 6B

|  | FD unit 0 | FD unit 1 | FD unit 3 | | ... | FD unit $N_3-2$ | FD unit $N_3-1$ |
|---|---|---|---|---|---|---|---|
| Port 3000 | $b_0 \cdot f_0^H[0]$ | $b_2 \cdot f_0^H[0]$ | $b_0 \cdot f_0^H[1]$ | $b_2 \cdot f_0^H[1]$ | ... | $b_0 \cdot f_0^H[N_3-1]$ | $b_2 \cdot f_0^H[N_3-1]$ |
| Port 3001 | $b_0 \cdot f_1^H[0]$ | $b_2 \cdot f_1^H[0]$ | $b_0 \cdot f_1^H[1]$ | $b_2 \cdot f_1^H[1]$ | ... | $b_0 \cdot f_1^H[N_3-1]$ | $b_2 \cdot f_1^H[N_3-1]$ |
| Port 3002 | $b_1 \cdot f_0^H[0]$ | $b_3 \cdot f_0^H[0]$ | $b_1 \cdot f_0^H[1]$ | $b_3 \cdot f_0^H[1]$ | ... | $b_1 \cdot f_0^H[N_3-1]$ | $b_3 \cdot f_0^H[N_3-1]$ |
| Port 3003 | $b_1 \cdot f_1^H[0]$ | $b_3 \cdot f_1^H[0]$ | $b_1 \cdot f_1^H[1]$ | $b_3 \cdot f_1^H[1]$ | ... | $b_1 \cdot f_1^H[N_3-1]$ | $b_3 \cdot f_1^H[N_3-1]$ |

⇐ ⇐ Different SD-FD pairs

FIG. 11

PORT SELECTION FOR CHANNEL STATE FEEDBACK WITH ANALOG FEEDFORWARD

CROSS-REFERENCE TO RELATED APPLICATION

This application is a national stage application under 35 U.S.C. 371 of PCT/CN2020/120104, filed Oct. 10, 2020, which claims benefit of and priority to PCT International Application No. PCT/CN2019/110286, filed Oct. 10, 2019, and which are hereby incorporated by reference in their entirety.

BACKGROUND

Field of the Disclosure

Aspects of the present disclosure relate to wireless communications, and more particularly, to techniques for port selection for channel state feedback with analog feedforward.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include channel state feedback port selection with analog feedforward.

One innovative aspect of the subject matter described in this disclosure can be implemented in a method for wireless communication by a user equipment (UE). The method generally includes selecting one or more channel state information reference signals (CSI-RS) ports, of a plurality of CSI-RS ports, for the UE to report CSI. The port selection includes selecting any of the plurality of CSI-RS ports to report the CSI or selecting CSI-RS ports based on a grouping of the plurality of CSI-RS ports. The method generally includes determining a precoding matrix indicator (PMI) formed by a linear combination of the one or more selected CSI-RS ports. The method generally includes computing at least wideband linear combination coefficients for the selected CSI-RS ports. The method generally includes providing the selected one or more CSI-RS ports and the computed wideband linear combination coefficients to a base station (BS) in a CSI report.

One innovative aspect of the subject matter described in this disclosure can be implemented in a method for wireless communication by a BS. The method generally includes transmitting a CSI request to a UE for a PMI formed by linear combination of a plurality of CSI-RS ports selected by the UE. The port selection includes a selection from any of the plurality of CSI-RS ports or a selection of CSI-RS ports based on a grouping of the plurality of CSI-RS ports. The method generally includes receiving a CSI report from the UE comprising at least the port selection and wideband linear combination coefficients.

One innovative aspect of the subject matter described in this disclosure can be implemented in an apparatus for wireless communication. The apparatus may include a memory and at least one processor coupled with the memory. The at least one processor coupled with the memory may be configured to select one or more CSI-RS ports, of a plurality of CSI-RS ports, for the apparatus to report CSI. The port selection may include selecting any of the plurality of CSI-RS ports to report the CSI; or selecting CSI-RS ports based on a grouping of the plurality of CSI-RS ports. The at least one processor coupled with the memory may be configured to determine a PMI formed by a linear combination of the one or more selected CSI-RS ports. The at least one processor coupled with the memory may be configured to compute at least wideband linear combination coefficients for the selected CSI-RS ports. The at least one processor coupled with the memory may be configured to provide the selected one or more CSI-RS ports and the computed wideband linear combination coefficients to a BS in a CSI report.

One innovative aspect of the subject matter described in this disclosure can be implemented in an apparatus for wireless communication. The apparatus may include a memory and at least one processor coupled with the memory. The at least one processor coupled with the memory may be configured to transmit a CSI request to a UE for a PMI formed by linear combination of a plurality of CSI-RS ports selected by the UE. The port selection may include a selection from any of the plurality of CSI-RS ports; or a selection of CSI-RS ports based on a grouping of the plurality of CSI-RS ports. The at least one processor coupled with the memory may be configured to receive a CSI report form the UE comprising at least the port selection and wideband linear combination coefficients.

One innovative aspect of the subject matter described in this disclosure can be implemented in an apparatus for wireless communication. The apparatus may include means for selecting one or more CSI-RS ports, of a plurality of CSI-RS ports, for the apparatus to report CSI. The port selection may include selecting any of the plurality of CSI-RS ports to report the CSI; or selecting CSI-RS ports based on a grouping of the plurality of CSI-RS ports. The apparatus may include means for determining a PMI formed by a linear combination of the one or more selected CSI-RS ports. The apparatus may include means for computing at least wideband linear combination coefficients for the selected CSI-RS ports. The apparatus may include means for providing the selected one or more CSI-RS ports and the computed wideband linear combination coefficients to a BS in a CSI report.

One innovative aspect of the subject matter described in this disclosure can be implemented in an apparatus for wireless communication. The apparatus may include means for transmitting a CSI request to a UE for a PMI formed by linear combination of a plurality of CSI-RS ports selected by the UE. The port selection may include a selection from any of the plurality of CSI-RS ports; or a selection of CSI-RS ports based on a grouping of the plurality of CSI-RS ports. The apparatus may include means for receiving a CSI report form the UE comprising at least the port selection and wideband linear combination coefficients.

One innovative aspect of the subject matter described in this disclosure can be implemented in a computer readable medium storing computer executable code thereon for wireless communication, comprising code for selecting one or more CSI-RS ports, of a plurality of CSI-RS ports, for a UE to report CSI, wherein the port selection comprises selecting any of the plurality of CSI-RS ports to report the CSI; or selecting CSI-RS ports based on a grouping of the plurality of CSI-RS ports; code for determining a PMI formed by a linear combination of the one or more selected CSI-RS ports; code for computing at least wideband linear combination coefficients for the selected CSI-RS ports; and code for providing the selected one or more CSI-RS ports and the computed wideband linear combination coefficients to a BS in a CSI report.

One innovative aspect of the subject matter described in this disclosure can be implemented in a computer readable medium storing computer executable code thereon for wireless communication, comprising code for transmitting a CSI request to a UE for a PMI formed by linear combination of a plurality of CSI-RS ports selected by the UE, wherein the port selection comprises a selection from any of the plurality of CSI-RS ports; or a selection of CSI-RS ports based on a grouping of the plurality of CSI-RS ports; and code for receiving a CSI report form the UE comprising at least the port selection and wideband linear combination coefficients.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 6A shows precoders for CSI-RS ports organized by CSI-RS resources, in accordance with aspects of the present disclosure.

FIG. 6B shows precoders for CSI-RS ports organized by CSI-RS resources, in accordance with aspects of the present disclosure.

FIG. 11 shows precoders across different CSR-RS ports and FD units, in accordance with aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
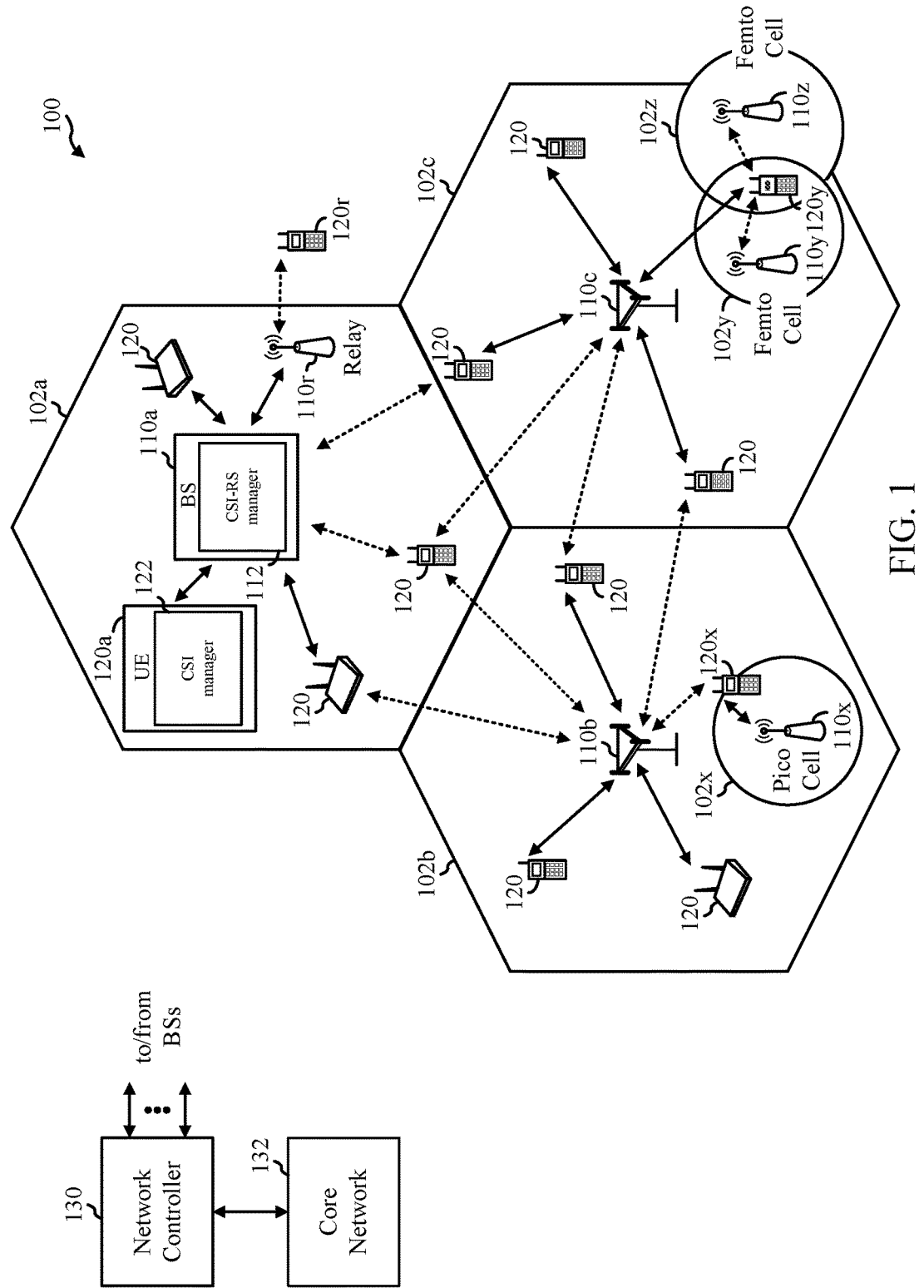
FIG. 1 is a block diagram conceptually illustrating an example telecommunications system, in accordance with certain aspects of the present disclosure.

Aspects of the present disclosure provide apparatus, methods, processing systems, and computer readable mediums for port selection for channel state feedback with analog feedforward.

The following description provides examples of port selection for channel state feedback with analog feedforward in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies me. For clarity, while aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for port selection for channel state feedback with analog feedforward. As shown in FIG. 1, the BS 110a includes a CSI-RS manager 112. The CSI-RS manager 112 may be configured to precode a plurality of CSI-RS ports by applying a different precoder at each of the CSI-RS ports and, for each CSI-RS port, apply the same precoder across all frequency domain (FD) units, and to transmit CSI-RS to a UE via the precoded CSI-RS ports, in accordance with aspects of the present disclosure. The CSI-RS manager 112 may be configured to transmit a request to the UE 120a for a PMI and to receive a CSI report from the UE, in accordance with aspects of the present disclosure. As shown in FIG. 1, the UE 120a includes a CSI manager 122. The CSI manager 122 may be configured to select one or more CSI-RS ports, of a plurality of CSI-RS ports, for the UE to report CSI with the port selection polarization-specific or polarization-common based on a grouping of the plurality of CSI-RS ports; determine a precoding matrix indicator (PMI) formed by a linear combination of the one or more selected CSI-RS ports; compute wideband linear combination coefficients for the selected CSI-RS ports; and to provide the selected one or more CSI-RS ports and the computed wideband linear combination coefficients to a BS in a CSI report, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
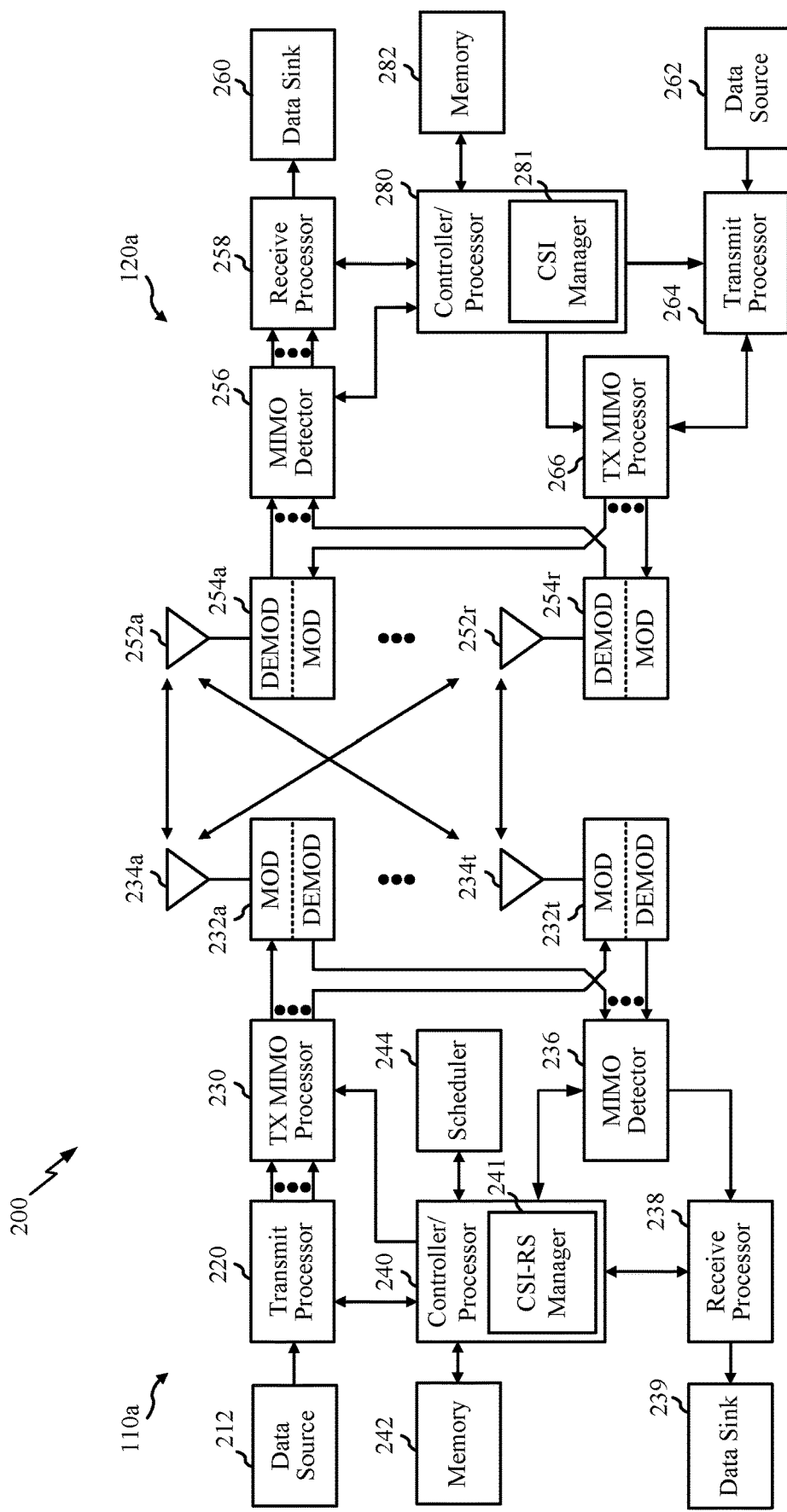
FIG. 2 is a block diagram conceptually illustrating a design of an example of a base station (BS) and a user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. For example, a base station may transmit a MAC CE to a user-equipment (UE) to put the UE into a discontinuous reception (DRX) mode to reduce the UE's power consumption. The MAC-CE may be carried in a shared channel such as a physical downlink shared channel (PDSCH), a physical uplink shared channel (PUSCH), or a physical sidelink shared channel. A MAC-CE may also be used to communicate information that facilitates communication, such as information regarding buffer status and available power headroom.

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and CSI-RS. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a CSI-RS manager 241 that may be configured for precoding a plurality of CSI-RS ports by applying a different precoder at each of the CSI-RS ports and, for each CSI-RS port, apply the same precoder across all FD units, and transmitting CSI-RS to a UE via the precoded CSI-RS ports, according to aspects described herein. As shown in FIG. 2, the controller/processor 280 of the UE 120a has a CSI manager 241 that may be configured for selecting one or more CSI-RS ports, of a plurality of CSI-RS ports, for the UE to report CSI with the port selection polarization-specific or polarization-common based on a grouping of the plurality of CSI-RS ports; determining a PMI formed by a linear combination of the one or more selected CSI-RS ports; computing wideband linear combination coefficients for the selected CSI-RS ports; and providing the selected one or more CSI-RS ports and the computed wideband linear combination coefficients to a BS in a CSI report, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
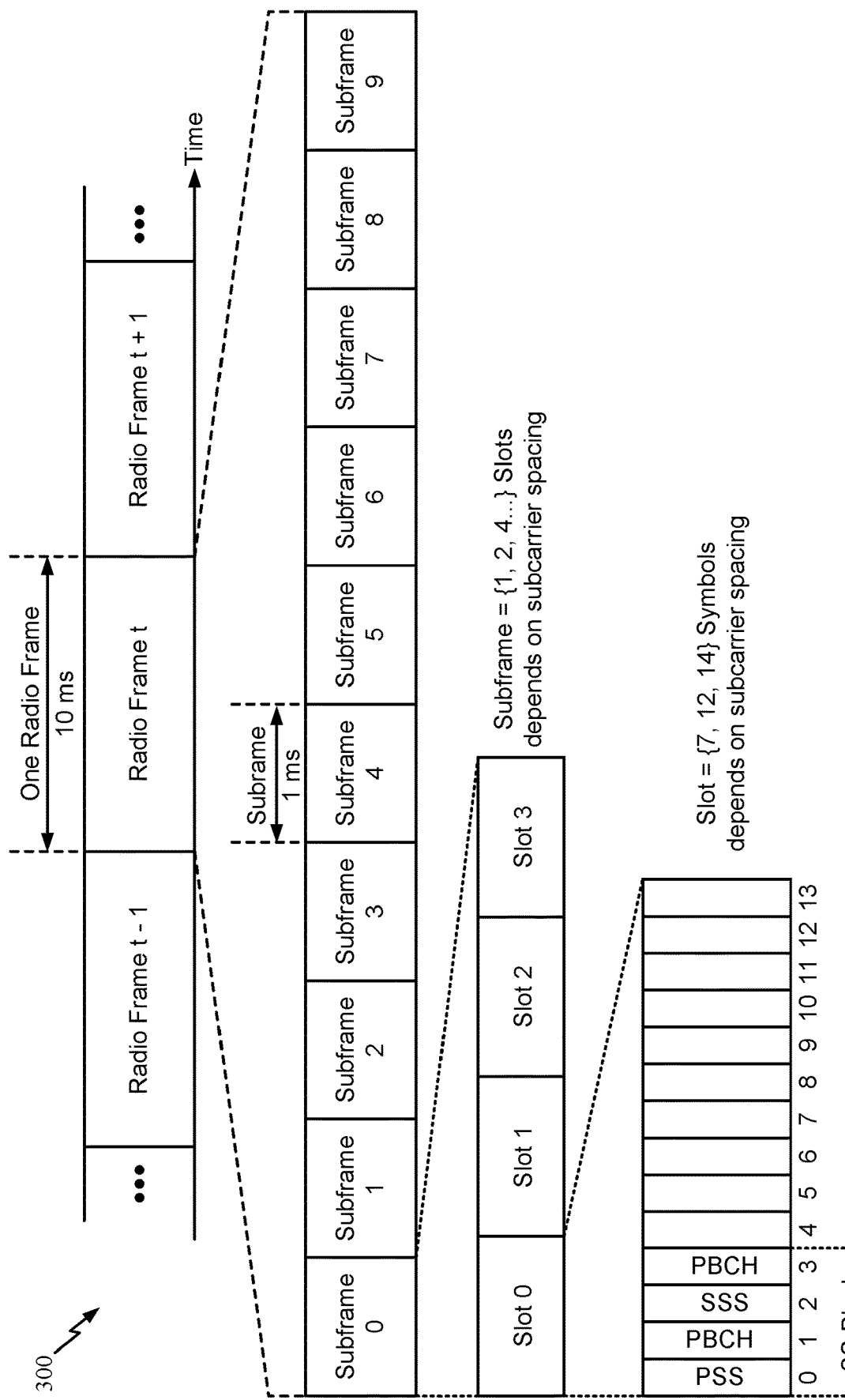
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

As discussed above, aspects of the disclosure relate to channel state feedback with analog feedforward. Channel state feedback may include channel state information (CSI) feedback.

Example CSI Configuration

CSI may refer to channel properties of a communication link. The CSI may represent the combined effects of, for example, scattering, fading, and power decay with a distance between a transmitter and a receiver. Channel estimation using pilots, such as CSI reference signals (CSI-RS), may be performed to determine these effects on a channel. The CSI may be used to adapt transmissions based on current channel conditions, which is useful for achieving reliable communication, in particular, with high data rates in multi-antenna systems. The CSI is typically estimated at the receiver, quantized, and fed back to the transmitter.

A UE (e.g., such as a UE 120a) may be configured by a BS (e.g., such as a BS 110) for CSI reporting. The BS may configure the UE with a CSI reporting configuration or with multiple CSI report configurations. The BS may provide the CSI reporting configuration to the UE via higher layer signaling, such as radio resource control (RRC) signaling (e.g., via a CSI-ReportConfig information element (IE)).

Each CSI report configuration may be associated with a single downlink bandwidth part (BWP). The CSI report setting configuration may define a CSI reporting band as a subset of subbands of the BWP. The associated DL BWP may indicated by a higher layer parameter (e.g., bwp-Id) in the CSI report configuration for channel measurement and contains parameter(s) for one CSI reporting band, such as codebook configuration, time-domain behavior, frequency granularity for CSI, measurement restriction configurations, and the CSI-related quantities to be reported by the UE. Each CSI resource setting may be located in the DL BWP identified by the higher layer parameter, and all CSI resource settings may be linked to a CSI report setting have the same DL BWP.

The CSI report configuration may configure time and frequency resources used by the UE to report the CSI. For example, the CSI report configuration may be associated with CSI-RS resources for channel measurement (CM), interference measurement (IM), or both. The CSI report configuration may configure the CSI-RS resources for measurement (e.g., via a CSI-ResourceConfig IE). The CSI-RS resources provide the UE with the configuration of CSI-RS ports, or CSI-RS port groups, mapped to time and frequency resources (e.g., resource elements (REs)). The CSI-RS resources can be zero power (ZP) or non-zero power (NZP) resources. At least one NZP CSI-RS resource may be configured for CM. For interference measurement, it can be NZP CSI-RS or zero power CSI-RS, which is known as CSI-IM (note, if NZP CSI-RS, it is called NZP CSI-RS for interference measurement, if zero power, it is called CSI-IM)

The CSI report configuration may configure the UE for aperiodic, periodic, or semi-persistent CSI reporting. For periodic CSI, the UE may be configured with periodic CSI-RS resources. Periodic CSI and semi-persistent CSI report on physical uplink control channel (PUCCH) may be triggered via RRC or a medium access control (MAC) control element (CE). For aperiodic and semi-persistent CSI on the physical uplink shared channel (PUSCH), the BS may signal the UE a CSI report trigger indicating for the UE to send a CSI report for one or more CSI-RS resources, or configuring the CSI-RS report trigger state (e.g., CSI-AperiodicTriggerStateList and CSI-SemiPersistentOnPUSCH-TriggerStateList). The CSI report trigger for aperiodic CSI and semi-persistent CSI on PUSCH may be provided via downlink control information (DCI). The CSI-RS trigger may be signaling indicating to the UE that CSI-RS will be transmitted for the CSI-RS resource. The UE may report the CSI feedback based on the CSI report configuration and the CSI report trigger. For example, the UE may measure the channel associated with CSI for the triggered CSI-RS resources. Based on the measurements, the UE may select a preferred CSI-RS resource. The UE reports the CSI feedback for the selected CSI-RS resource.

The CSI report configuration can also configure the CSI parameters (sometimes referred to as quantities) to be reported. Codebooks may include Type I single panel, Type I multi-panel, and Type II single panel. Regardless which codebook is used, the CSI report may include at least the channel quality indicator (CQI), precoding matrix indicator (PMI), CSI-RS resource indicator (CRI), and rank indicator (RI). The structure of the PMI may vary based on the codebook. The CRI, RI, and CQI may be in a first part (Part I) and the PMI may be in a second part (Part II) of the CSI report.

For the Type I single panel codebook, the PMI may include a W1 matrix (e.g., subest of beams) and a W2 matrix (e.g., phase for cross polarization combination and beam selection). For the Type I multi-panel codebook, compared to type I single panel codebook, the PMI further comprises a phase for cross panel combination. The BS may have a plurality of transmit (TX) beams. The UE can feed back to the BS an index of a preferred beam, or beams, of the candidate beams. For example, the UE may feed back the precoding vector w for the l-th layer:

$$w_l = \begin{pmatrix} b_{+45pol} \\ \varphi \cdot b_{-45pol} \end{pmatrix},$$

where b represents the oversampled beam (e.g., discrete Fourier transform (DFT) beam), for both polarizations, and φ is the co-phasing.

For the Type II codebook (e.g., which may be designed for single panel), the PMI is a linear combination of beams; it has a subset of orthogonal beams to be used for linear combination and has per layer, per polarization, amplitude and phase for each beam. The preferred precoder for a layer can be a combination of beams and associated quantized coefficients, and the UE can feedback the selected beams and the coefficients to the BS.

The UE may report the CSI feedback based on the CSI report configuration and the CSI report trigger. For example, the UE may measure the channel associated with CSI for the triggered CSI-RS resources. Based on the measurements, the UE may select a preferred CSI-RS resource. The UE reports the CSI feedback for the selected CSI-RS resource. LI may be calculated conditioned on the reported CQI, PMI, RI and CRI; CQI may be calculated conditioned on the reported PMI, RI and CRI; PMI may be calculated conditioned on the reported RI and CRI; and RI may be calculated conditioned on the reported CRI.

Example SD Compressed CSI

In certain systems (e.g., Release 15 5G NR), the UE may be configured to report at least a Type II precoder across configured frequency domain (FD) units. The UE may report wideband (WB) PMI and/or subband (SB) PMI as configured.

For a layer l, its precoder across $N_3$ FD units (also referred to as PMI subbands) may be given by a size-$N_t \times N_3$ matrix $W_l$ as follows:

$$W_l = W_1 \times W_{2,l},$$

where $W_1$ and $W_{2,l}$ are as described in the following table:

| Notation | size | description | Comment |
|---|---|---|---|
| $W_1$ | $N_r \times 2L$ | SD basis; same SD bases are applied to both polarizations | Layer-common |
| $W_{2,l}$ | $2L \times N_3$ | Coefficient matrix: | Layer-specific; |

Note:
L value is rank-common and layer-common

The two matrices can be written as:

$$W_1 = \begin{bmatrix} v_{m_1^{(0)}, m_2^{(0)}}, v_{m_1^{(1)}, m_2^{(1)}}, \ldots, v_{m_1^{(L-1)}, m_2^{(L-1)}} & 0 \\ 0 & v_{m_1^{(0)}, m_2^{(0)}}, v_{m_1^{(1)}, m_2^{(1)}}, \ldots, v_{m_1^{(L-1)}, m_2^{(L-1)}} \end{bmatrix},$$

where the SD bases are DFT based and the SD basis with index $m_1^{(i)}$ and $m_2^{(i)}$ is written as $$v_{m_1^{(i)}, m_2^{(i)}} = \begin{bmatrix} u_{m_2^{(i)}} & e^{\frac{j2\pi m_1^{(i)}}{O_1 N_1}} u_{m_2^{(i)}} & \ldots & e^{\frac{j2\pi m_1^{(i)}(N_1-1)}{O_1 N_1}} u_{m_2^{(i)}} \end{bmatrix}^T,$$

$$u_{m_2^{(i)}} = \begin{bmatrix} 1 & e^{\frac{j2\pi m_2^{(i)}}{O_2 N_2}} & \ldots & e^{\frac{j2\pi m_2^{(i)}(N_2-1)}{O_2 N_2}} \end{bmatrix}$$

and where the coefficient matrix may be written as $$W_{2,l} = \begin{bmatrix} p_{0,l,0}^{(1)} p_{0,l,0}^{(2)} e^{j\phi_{0,l,0}} & p_{0,l,1}^{(1)} p_{0,l,1}^{(2)} e^{j\phi_{0,l,1}} & \ldots & p_{0,l,M-1}^{(1)} p_{0,l,M-1}^{(2)} e^{j\phi_{0,l,M-1}} \\ p_{1,l,0}^{(1)} p_{1,l,0}^{(2)} e^{j\phi_{1,l,0}} & p_{1,l,1}^{(1)} p_{1,l,1}^{(2)} e^{j\phi_{0,l,1}} & \ldots & p_{1,l,M-1}^{(1)} p_{1,l,M-1}^{(2)} e^{j\phi_{1,l,M-1}} \\ \vdots & \vdots & \ddots & \vdots \\ p_{L-1,l,0}^{(1)} p_{L-1,l,0}^{(2)} e^{j\phi_{L-1,l,0}} & p_{L-1,l,1}^{(1)} p_{L-1,l,1}^{(2)} e^{j\phi_{L-1,l,1}} & \ldots & p_{L-1,l,M-1}^{(1)} p_{L-1,l,M-1}^{(2)} e^{j\phi_{L-1,l,M-1}} \\ p_{L,l,0}^{(1)} p_{L,l,0}^{(2)} e^{j\phi_{L,l,0}} & p_{L,l,1}^{(1)} p_{L,l,1}^{(2)} e^{j\phi_{L,l,1}} & \ldots & p_{L,l,M-1}^{(1)} p_{L,l,M-1}^{(2)} e^{j\phi_{L,l,M-1}} \\ p_{L+1,l,0}^{(1)} p_{L+1,l,0}^{(2)} e^{j\phi_{L+1,l,0}} & p_{L+1,l,1}^{(1)} p_{L+1,l,1}^{(2)} e^{j\phi_{L+1,l,1}} & \ldots & p_{L+1,l,M-1}^{(1)} p_{L+1,l,M-1}^{(2)} e^{j\phi_{L+1,l,M-1}} \\ \vdots & \vdots & \ddots & \vdots \\ p_{2L-1,l,0}^{(1)} p_{2L-1,l,0}^{(2)} e^{j\phi_{2L-1,l,0}} & p_{2L-1,l,1}^{(1)} p_{2L-1,l,1}^{(2)} e^{j\phi_{2L-1,l,1}} & \ldots & p_{2L-1,l,M-1}^{(1)} p_{2L-1,l,M-1}^{(2)} e^{j\phi_{2L-1,l,M-1}} \end{bmatrix}$$

In some cases, a common (P1) value may apply to all $p_{i,m,l}^{(1)}$ coefficients (or simply P1 coefficients) in one row. In such cases, given 2L rows in the matrix, the P1 value is row-specific and there might be 2L different values for these coefficients. The coefficients $p_{i,m,l}^{(1)}$, $p_{i,m,l}^{(2)}$ and $\varphi_{i,m,l}$ are described as follows:

| Notation | description | Alphabet |
|---|---|---|
| $p_{i,m,l}^{(1)}$ | Reference amplitude for beam i of the $1^{st}$ polarization. $p_{i,m,l}^{(1)} = p_{i',m',l}^{(1)}$, $\forall i' \neq i, m' \neq m$ | $\{1, \sqrt{1/2}, \sqrt{1/4}, \sqrt{1/8}, \sqrt{1/16}, \sqrt{1/32}, \sqrt{1/64}, 0\}$ |
| $p_{i+L,m,l}^{(1)}$ | Reference amplitude for the $2^{nd}$ polarization. $p_{i+L,m,l}^{(1)} = p_{i'+L,m',l}^{(1)}$, $\forall i' \neq i, m' \neq m$ | $\{1, \sqrt{1/2}, \sqrt{1/4}, \sqrt{1/8}, \sqrt{1/16}, \sqrt{1/32}, \sqrt{1/64}, 0\}$ |
| $p_{i,m,l}^{(2)}$ and $p_{i+L,m,l}^{(2)}$ | Differential amplitude for each individual coefficient | $\{1, \sqrt{0.5}\}$ |
| $\varphi_{i,m,l}$ and $\varphi_{i+L,m,l}$ | Phase of each individual coefficient | N-PSK, N = 4 or 8 |

More precisely, the linear combination representation may be written as:

$$W_l = \begin{pmatrix} \sum_{i=0}^{L-1} v_{m_1^{(i)},m_2^{(i)}} p_{i,m,l}^{(1)} p_{i,m,l}^{(2)} \varphi_{i,m,l} \\ \sum_{i=0}^{L-1} v_{m_1^{(i)},m_2^{(i)}} p_{i,m,l}^{(1)} p_{i,m,l}^{(2)} \varphi_{i,m,l} \end{pmatrix}$$

For linear combination of spatial beams B, the UE may report the linear combination coefficients $x_{i,k}^{(l)}$ for each layer l and each subband i, according to the precoding vector w:

$$W_i^{(l)} = \begin{pmatrix} B & 0 \\ 0 & B \end{pmatrix} \times x_i^{(l)} = \begin{pmatrix} \sum_{k=0}^{L-1} b_k \cdot x_{i,k}^{(l)} \\ \sum_{k=0}^{L-1} b_k \cdot x_{i+L,k}^{(l)} \end{pmatrix}$$

The precoder matrix W is based on the spatial domain (SD) compression of a matrix $W_1$ matrix and the $W_2$ matrix for reporting (for cross-polarization) the linear combination coefficients for the selected beams (2L) across the configured FD units.

For port selection in certain systems (e.g., Rel-15 NR port selection), the BS (e.g., a gNB) may use a beam in $v_{m_1^{(i)},m_2^{(i)}}$ as the precoder for CSI-RS. The precoder for a layer on a subband is given by:

$$\begin{pmatrix} \sum_{i=0}^{L-1} v_{i_{11}d+i} \cdot p_i^{(1)} \cdot p_i^{(2)} \cdot \phi_i \\ \sum_{i=0}^{L-1} v_{i_{11}d+i} \cdot p_{i+L}^{(1)} \cdot p_i^{(2)} \cdot \phi_{i+L} \end{pmatrix},$$

where $v_{i_{11}d+i}$ is a vector. In this case, the UE selects the CSI-RS ports, for example, instead of selecting the beam. Thus, using this codebook, if the $(i_{11}d+i)$-th entry is equal to 1 and the rest are 0s, this means that the $(i_{11}d+i)$-th port is selected. With this codebook, there are P ports, where the first half of the ports are for polarization 1 and the other half of the ports are for polarization 2, and the same L ports are applied to both polarization. The UE reports the preferred candidate L ports via $i_{11}$, where the candidates are candidate L ports is 0 ... L−1, and candidate L ports d ... d+L−1. The last candidate L ports is $$\left\lceil \frac{P}{2d} \right\rceil d, \ldots, \mod\left(\left\lceil \frac{P}{2d} \right\rceil d + L - 1, \frac{P}{2}\right).$$

In this case, the UE may be restricted to select L consecutive ports (e.g., port $i_{11}d, \ldots i_{11}d+L-1$) and the maximum number ports may be 32, which may be insufficient and should accomodate FD basis.

Example SD and FD Compressed CSI

In certain systems (e.g., Rel-16 5G NR), the UE may be configured to report frequency domain (FD) compressed precoder feedback to reduce overhead of the CSI report. With codebook operation with FD compression, for a layer l, its precoder across $N_3$ FD units (e.g., PMI subbands) is given by a size-$N_t \times N_3$ matrix $W_l$ as follows:

$$W_l = W_1 \times \tilde{W}_{2,l} \times W_{f,l}^H,$$

where $W_1$, $\tilde{W}_2$ and $W_f$ are as follows:

| Notation | size | description | Comment |
|---|---|---|---|
| $W_1$ | $N_t \times 2L$ | SD basis; same SD bases are applied to both polarizations | Layer-common |
| $\tilde{W}_{2,l}$ | $2L \times M$ | Coefficient matrix: Consist of max $K_0$ NZC per-layer; Consist of max $2K_0$ NZC across all layers | Layer-specific; |
| $W_{f,l}$ | $M \times N_3$ | FD basis; same M FD bases are applied to both polarizations | Layer-specific; |

Note:
L value is rank-common and layer-common
M value is rank-group specific and layer-common. M = $M_{1,2}$ for RI = {1, 2} and M = $M_{3,4} \le M_{1,2}$ for RI = {3, 4}

The precoder matrix ($W_{2,i}$) for layer i with i=0,1 may use an FD compression $W_{f,i}^H$ matrix to compress the precoder matrix into $\tilde{W}_{2,i}$ matrix size to 2L×M (where M is network configured and communicated in the CSI configuration message via RRC or DCI, and M<$N_3$) given as:

$$W_i = W_1 \tilde{W}_{2,i} W_{f,i}^H,$$

where the precoder matrix $W_i$ (not shown) has P=$2N_1N_2$ rows (spatial domain, number of ports) and $N_3$ columns (frequency-domain compression unit containing RBs or reporting sub-bands), and where M bases are selected for each of layer 0 and layer 1 independently. The $\tilde{W}_{2,0}$ matrix consists of the linear combination coefficients (amplitude and co-phasing), where each element represents the coefficient of a tap for a beam. The $\tilde{W}_{2,0}$ matrix may be defined by size 2L×M, where one row corresponds to one spatial beam in $W_1$ (not shown) of size P×2L (where L is network configured via RRC), and one entry therein represents the coefficient of one tap for this spatial beam.

The UE may be configured to report (e.g., CSI report) a subset $K_0 < 2LM$ of the linear combination coefficients of the $\tilde{W}_{2,0}$ matrix. For example, the UE may report $K_{NZ,i} < K_0$ coefficients (where $K_{NZ,i}$ corresponds to a maximum number of non-zero coefficients for layer-i with i=0 or 1, and $K_0$ is network configured via RRC) illustrated as shaded squares (unreported coefficients are set to zero). In some configurations, an entry in the $\tilde{W}_{2,0}$ matrix corresponds to a row of $W_{f,0}{}^H$ matrix. In the example shown, both the $\tilde{W}_{2,0}$ matrix at layer 0 and the $\tilde{W}_{2,0}$ matrix at layer 1 are 2L×M.

The $W_{f,0}{}^H$ matrix is composed of the basis vectors (each row is a basis vector) used to perform compression in frequency domain. In the example shown, both the $W_{f,0}{}^H$ matrix at layer 0 and the $W_{f,1}{}^H$ matrix at layer 1 include M=4 FD basis from $N_3$ candidate DFT basis. In some configurations, the UE may report a subset of selected basis of the $W_{f,i}{}^H$ matrix via CSI report. The M bases specifically selected at layer 0 and layer 1. That is, the M bases selected at layer 0 can be same/partially-overlapped/non-overlapped with the M bases selected at layer 1.

The precoder may be written as:

$$W^{(l)} = \begin{pmatrix} \sum_{k=0}^{L-1}\sum_{m=0}^{M-1} b_k \cdot x_{m,k}^{(l)} \cdot f_{m,l}^H \\ \sum_{k=0}^{L-1}\sum_{m=0}^{M-1} b_k \cdot x_{m,k+L}^{(l)} \cdot f_{m,l}^H \end{pmatrix}$$

As discussed above, the Type II CSI with FD compression may compress $N_3$ subbands via M FD bases. The FD bases are selected/reported layer-specific. For each layer, the UE reports a subset of the total 2LM coefficients, where the coefficient selection may be layer specific, and the UE may use a size-2LM bitmap to indicate the selected non-zero coefficients (NZC) and report each the NZC after quantization. In some examples, the UE may report up to $K_0$ coeffcients per layer, where $K_{NZ,l} \leq K_0$. In some examples, the UE may report up to $2K_0$ coefficients across all layers, where $\Sigma_{l=0}^{RI-1} K_{NZ,l} \leq 2K_0$. Unreported are set to zeros.

The UE may report the CSI in uplink control information (UCI). In some examples, the CSI is reported in a two-part UCI. In some examples, in the UCI part one the UE may transmit RI, CQI, the number of non-zero coefficients (NNZC). In some examples, in the UCI part two the UE may transmit for the supported layers (e.g., layers 0 to RI–1) the SD beam selection, FD basis selection, coefficient selection, strongest coefficient indication (SCI), and/or coefficient quantization. The SD beam selection may indicate the selected beams (e.g., the subset of 2L beams).

Example Port Selection for Channel State Feedback with Analog Feedforward

In certain systems (e.g., such NR Release-16 systems and later), channel state information (CSI) can be compressed in the spatial domain (SD) and the frequency domain (FD). The base station (BS), which may be a next generation NodeB (gNB), may precode the CSI reference signal (RS) port and emulate the precoder (e.g., instead of configuring the SD and FD basis to the UE). This may be referred to as analog feedforward.

Analog Feedforward CSI Framework:

According to certain aspects, the CSI can be compressed as shown in the following expression:

$$\sum_{i=0}^{2L-1}\sum_{m=0}^{M-1} b_i \cdot c_{i,m} \cdot f_m^H \rightarrow \sum_{i=0}^{2L-1}\sum_{m=0}^{M-1} \underbrace{b_i \cdot f_m^H}_{G_k} \cdot c_{i,m} \rightarrow \sum_{k=0}^{2LM-1} G_k \cdot c_k,$$

where
L is the number of SD basis, M is the number of FD basis, b is the SD basis vector, f is the FD basis vector, and c is the linear combination coefficients to combine the SD and FD bases.

As shown in the formula above, with two polarizations, a particular SD and a particular FD basis form matrix $G_k$. with size P×$N_3$ across the $N_3$ subbands. Since there are L SD bases and M FD bases, the final precoder is actually a linear combination of 2LM matrices (i.e., $G_0$, ..., $G_k$).

Figure 4:
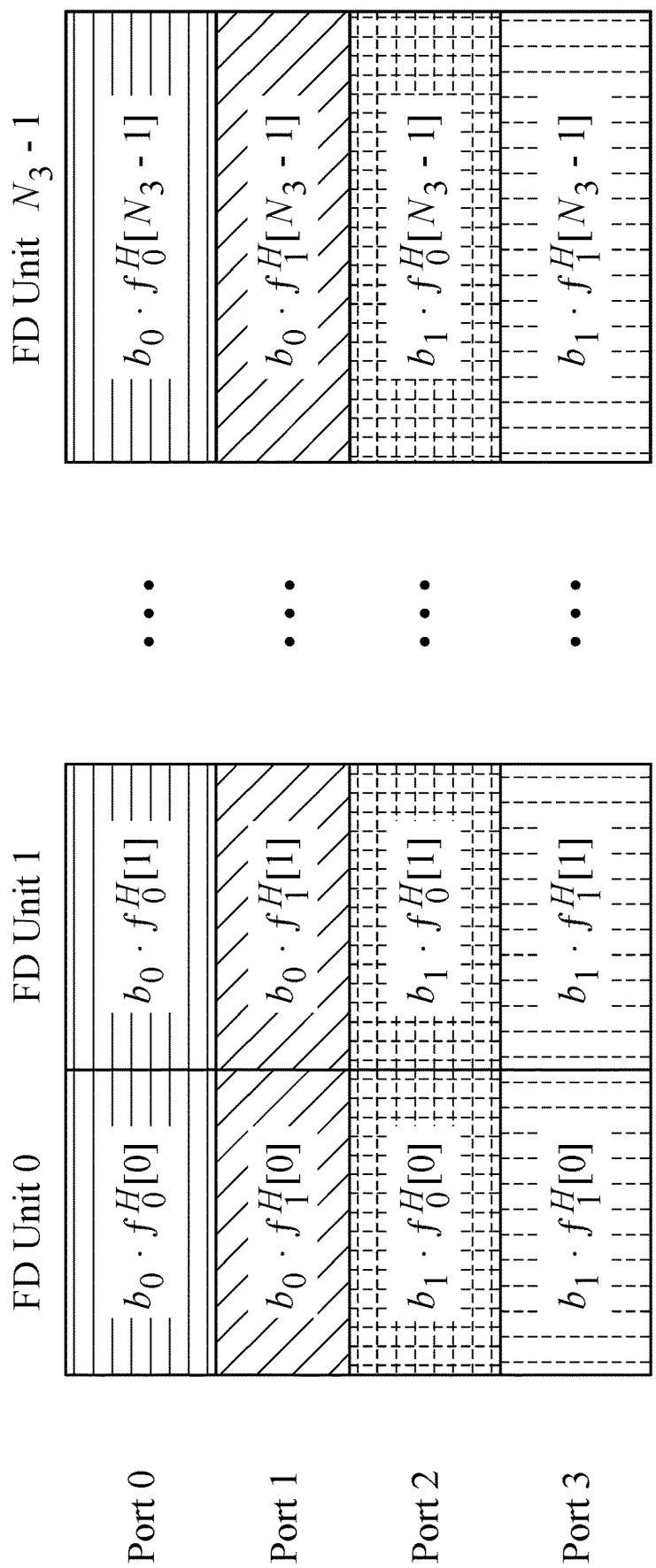
FIG. 4 shows precoders across different channel state information reference signal (CSR-RS) ports and frequency domain (FD) units, in accordance with aspects of the present disclosure.

In certain systems (e.g., Rel-16 NR or later), in the port-selection codebook, a CSI-RS port on $N_3$ FD units (e.g., an FD unit may be a resource block (RB) or a subband) is precoded with a virtual port (e.g., a specific SD basis and a specific FD basis). As shown in FIG. 4, each CSI-RS port (Port 0, Port 1, Port 2, Port 3) is associated with the same SD and FD basis across all subbands (e.g., Port 0 is associated with the same SD basis $b_0$ and FD basis $f_0{}^H$ across all of the FD units 0 ... $N_3$), but is rotated on each FD unit or subband (e.g., for Port 0 the FD basis $f_0{}^H$ is rotated [0 ... $N_3$–1] on all of the FD units 0 ... $N_3$–1, respectively). As shown in FIG. 4, each of the CSI-RS ports uses a different SD basis and/or FD basis as the other CSI-RS ports. In some examples, the BS can obtain the spatial reciprocity and delay reciprocity via the sounding reference signal sent from UE, and then perform the precoding using the SD and/or FD basis derived based on the obtained spatial/delay reciprocity.

The SD and FD bases are emulated by the BS (e.g., a gNB) and, thus, can be transparent to the UE. In this case, the UE may not know or be configured with the SD and FD bases. Instead, the UE can perform CSI-RS port selection, form the precoding matrix indicator (PMI), and compute linear combination coefficients for the selected CSI-RS. For example the UE selected $K_0$ CSI-RS ports of a set of P CSI-RS ports. The $K_0$ may be configured by the BS. The BS emulate the P CSI-RS ports out of $N_1 N_2 N_3$ candidate basis.

The UE can do a covariance wideband computation to derive the coefficients for the selected CSI-RS ports. The UE can then report $K_0$ wideband coefficients associated with the $K_0$ selected CSI-RS ports.

Thus, as compared to digital feedforward CSI feedback, the CSI reporting overhead and complexity can be reduced. Also, there may be increased flexibility with the CSI-RS emulation. Also, the FD unit granularity may be finer (e.g., RB-level).

Example Polarization-Common and Polarization-Specific Precoding:

According to certain aspects, the CSI-RS port precoding and selection may be polarization-common or polarization-specific.

For polarization common port-selection, the same port may be used for polarization. In some examples, the BS uses the same precoder on corresponding ports in the different polarization. In some examples, the UE assumes an organization of the CSI-RS ports. The organization may be configured by the BS or specified in the wireless standards.

For polarization-common port selection, a first half of CSI-RS ports may be on polarization 1 and the other half of CSI-RS ports may be on polarization 2; although other uneven splits of the ports could be done for the polarizations. It is precoded (port-wise) similar to the $2^{nd}$ half of CSI-RS ports.

With polarization-common port selection, the PMI for a layer on any of the $N_3$ FD units may be given by:

$$\begin{pmatrix} \sum_{k=0}^{K_0/2-1} v_{i_k} \cdot c_k \\ \sum_{k=0}^{K_0/2-1} v_{i_k} \cdot c_{k+K_0/2} \end{pmatrix},$$

where $v_{i_k}$ is of size $$\frac{P}{2} \times 1.$$

When there is only one "1" in row $i_k$, and where P is the total number of CSI-RS ports, it means that the $i_k$-th port is selected on all $N_3$ FD units. $c_k$ may be the linear combination coefficient associated with port $i_k$ on polarization 1 and $c_{k+K_0/2}$ may be the linear combination coefficient associated with port $i_k$ on polarization 2. The number UE may use $K_0$ (or $K_0/2$) number of the CSI-RS ports combination. The UE then reports $$v_{i_0}, \ldots v_{i_{K_0/2-1}} \text{ and } c_0, \ldots c_{K_0-1}$$

or a subset of $c_0, \ldots c_{K_0-1}$. The unreported ports are set to 0.

In the matrix formulation for the polarization-common port selection, the PMI for a layer on any of the $N_3$ FD units is:

$$W_1 \times W_2, \text{ where}$$

$$W_1 = \begin{bmatrix} X & 0 \\ 0 & X \end{bmatrix},$$

$$X = \begin{bmatrix} v_{i_0}, \ldots v_{i_{K_0/2-1}} \end{bmatrix} \text{ is size } P \times \frac{K_0}{2}, \text{ and where}$$

$$W_2 = \begin{bmatrix} c_0, \ldots c_{K_0-1} \end{bmatrix}^T$$

contains the coefficients, and $K_0$ (or $K_0/2$) is the number of ports used for combination.

The UE reports $$v_{i_0}, \ldots v_{i_{K_0/2-1}} \text{ and } c_0, \ldots c_{K_0-1}$$

or a subset of $c_0, \ldots c_{K_0-1}$. The unreported CSI-RS ports are set to 0.

For polarization-specific port selection, the BS may use different precoders on CSI-RS ports in the different polarization. For example, a first portion of CSI-RS ports (e.g., 20 CSI-RS ports) may be for polarization 1 and a second portion of CSI-RS ports (e.g., 12 CSI-RS ports) may be for polarization 2. In some examples, the UE may select any of the CSI-RS ports for combining.

With polarization-specific port selection, the PMI for a layer on any of the $N_3$ FD units may be given by:

$$\Sigma_{k=0}^{K_0-1} v_{i_k} \cdot c_k,$$

where $v_{i_k}$ is of size P×1 with only one "1" in row $i_k$, P is the total number of CSI-RS ports, meaning the $i_k$-th port is selected on all $N_3$ FD units.

The UE reports $$v_{i_0}, \ldots, v_{i_{K_0-1}} \text{ and } c_0, \ldots c_{K_0-1}$$

or a subset of $c_0, \ldots c_{K_0-1}$. The unreported CSI-RS ports are set to 0

In the matrix formulation for the polarization-common port selection, the PMI for a layer on any of the $N_3$ FD units is:

$$W_1 \times W_2, \text{ where}$$

$$W_1 = \begin{bmatrix} v_{i_0}, \ldots v_{i_{K_0-1}} \end{bmatrix} \text{ is size } P \times K_0.$$

The UE reports $$v_{i_0}, \ldots v_{i_{K_0-1}} \text{ and } c_0, \ldots c_{K_0-1}$$

or a subset of $c_0, \ldots c_{K_0-1}$. The unreported CSI-RS ports are set to 0.

Example Organization of CSI-RS Ports:

According to certain aspects, the precoding and port organization is transparent to the UE. For example, the BS can emulate each port with a precoder, and the UE can freely select CSI-RS to use for combination. In this example, there may not be any configured, defined, or specified organization of the CSI-RS ports. In some examples, this may be used when the port selection is polarization-specific.

According to certain aspects, the precoding and port selection may be non-transparent to the UE. For example, the CSI-RS ports may be organized. The organization may be configured by the BS and/or specified in a wireless standard. In some examples, this may be used when the port selection is polarization-common.

Figure 5:
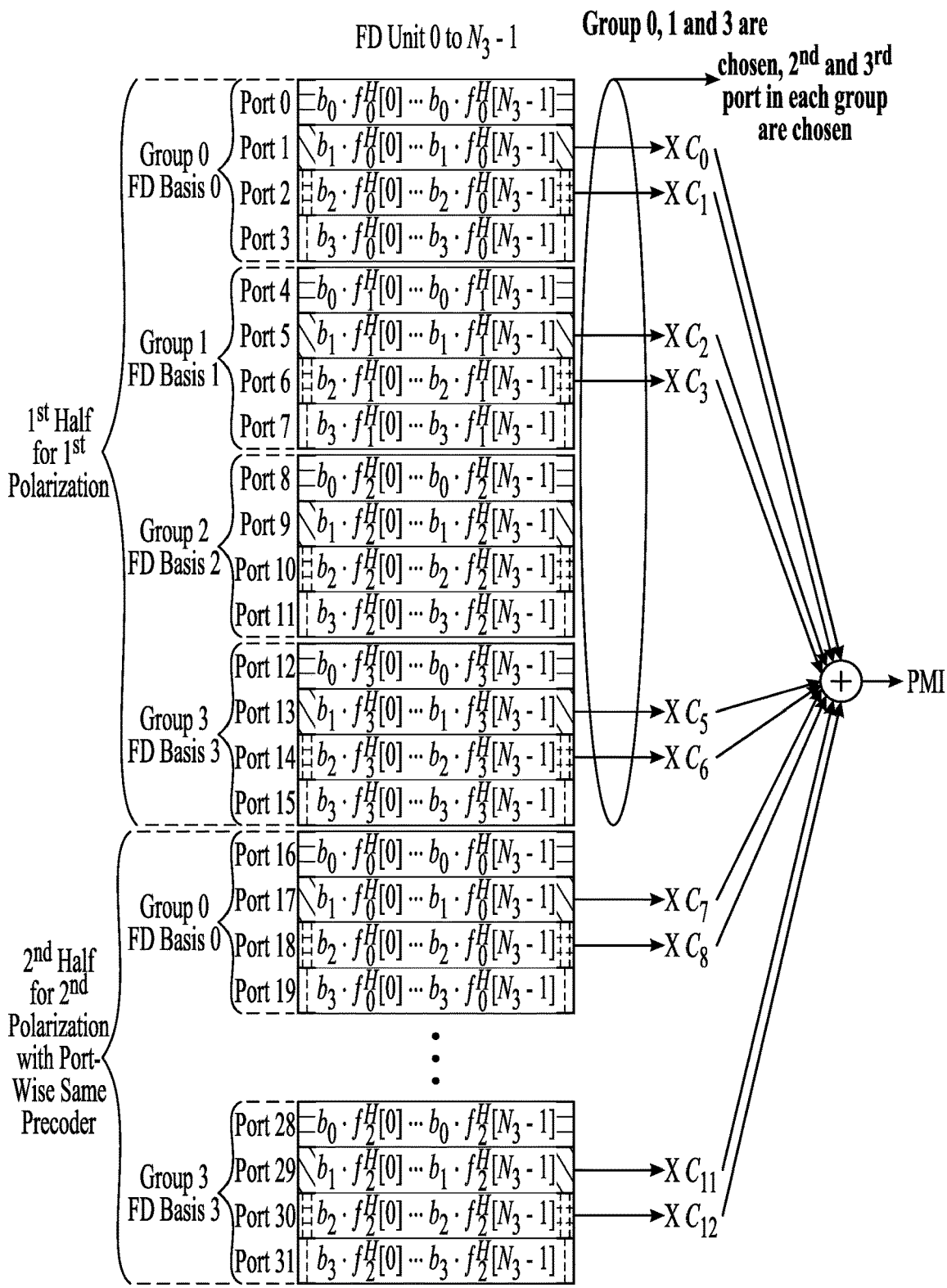
FIG. 5 shows precoders for CSI-RS ports organized by groups, in accordance with aspects of the present disclosure.

In some examples, the CSI-RS ports may organized in a single resource. For example, a part (e.g., half) of the CSI-RS ports can be applied on polarization 1 and another portion (e.g., the other half) of the CSI-RS ports. For each part (e.g., each half), the CSI-RS ports can be portioned into groups (e.g., M groups), as shown in FIG. 5. Each group of CSI-RS ports may correspond to a particular SD or FD basis. In other words, each CSI-RS port in a given group is associated with the same FD or SD basis. Within the CSI-RS group, each different CSI-RS port is associated with a different SD basis (when the group is associated with the same FD basis) or a different FD basis (when the group is associated with the same SD basis), as shown in FIG. 5.

In this case, in selecting and reporting selected CSI-RS, the UE can determine/report the group index (or indices) of selected CSI-RS ports, and may further determine/report the port index of the selected CSI-RS ports within the groups. The group index and/or the CSI-RS port index may be determined/reported layer-specific or layer-common and rank-specific or rank-common. The port selection within each group can be same or different. FIG. 5 illustrates an example with the second and third CSI-RS ports chosen from the groups 0, 1, and 3, across both polarizations, for computing the PMI to report with CSI.

In some examples, the CSI-RS ports may be organized across resources as shown in FIG. 6A and FIG. 6B. For example, a part (e.g., half) of the CSI-RS ports can be applied on polarization 1 and another portion (e.g., the other half) of the CSI-RS ports. Each resource may be associated with all of the CSI-RS (i.e., both parts) and each resource may correspond to a particular FD or SD basis. In other words, in a resource all of the CSI-RS are associated with the same FD (or SD) basis and, then, in the other resources all of the CSI-RS ports are associated with a different FD (or SD) basis. Then, within each resource, at least for a polarization, each CSI-RS port is associated with different SD basis (when the resource is associated with the same FD basis) or a different FD basis (when the resource is associated with the same SD basis), as shown in FIG. 6A and FIG. 6B.

In this case, in selecting and reporting selected CSI-RS, the UE can determine/report the resource index (or indices) of selected CSI-RS ports, and may further determine/report the port index of the selected CSI-RS ports within the resource. The resource index and/or the CSI-RS port index may be determined/reported layer-specific or layer-common and rank-specific or rank-common. The CSI-RS port index can be same or different across different resources Example Port Selection:

As mentioned above, the BS may configure a number of CSI-RS ports for the UE to use for linear combination (e.g., $K_0$). $K_0$ may be configured rank-common or rank-specific (e.g., different number of ports for different ranks). In some examples, the number of CSI-RS ports for higher rank can be derived from the number of CSI-RS ports to use for lower rank. In some examples, the UE can (freely) select any CSI-RS ports from the total P CSI-RS ports, up to the configured $K_0$ number of CSI-RS ports per layer, and up to total 2 $K_0$ CSI-RS across all layers.

According to certain aspects, the BS may further configure a number of CSI-RS port groups or a number of CSI-RS resources for which the UE can select CSI-RS ports, when the group or resources are configured as described above. The number of CSI-RS ports groups/resources may be equal to the number of FD basis (M) or SD basis (L), depending on whether the FD or SD is associated with the groups/resources. The BS can further configure a number of CSI-RS ports in the CSI-RS port group/resource that the UE can select. The number of CSI-RS ports with the groups/resources may be equal to the number of FD basis (M) or SD basis (L), depending on whether the FD or SD is associated with the CSI-RS ports within the groups/resources.

In some examples, in the case of CSI-RS port grouping organization, the group selection may be common for groups in both portions of the CSI-RS ports (e.g., to groups in both polarizations) and, further, the port selection in the groups can also be common in both portions (e.g., as shown in the example groupings in FIG. 5). For example, the SD and FD selection may be polarization common. In some examples, the group selection may be common for groups in both portions, but the port selection in the groups may be group specific or group-pair specific. For example, UE may select and report $1^{st}$ and $3^{rd}$ group for the first plurality of ports, and this also indicates that the $1^{st}$ and $3^{rd}$ group for the second plurality are selected. However, the port selection/report within each group can be different across different groups, e.g., port 1 and 2 in the $1^{st}$ group for the first plurality of ports are selected, while port 1 and 3 in the $3^{rd}$ group for the first plurality of ports are selected, port 2 and 4 in the $1^{st}$ group for the second plurality of ports are selected, while port 2 and 3 in the $3^{rd}$ group for the second plurality of ports are selected. Considering that the group index corresponds to SD basis, and the port index in each group corresponds to an FD basis, then this may correspond to the first and third SD basis are selected for both the first polarization and second polarization, while the $1^{st}$ and $2^{nd}$ FD bases are selected for the first SD basis on the first polarization, the $1^{st}$ and $3^{rd}$ FD bases are selected for the third SD basis on the first polarization, the $2^{nd}$ and $4^{th}$ FD bases are selected for the first SD basis on the second polarization, the $2^{nd}$ and $3^{rd}$ FD bases are selected for the third SD basis on the second polarization. In some examples, the group selection may be specific for groups in both portions, but the port selection in the groups may be group-common. For example, UE may select and report $1^{st}$ and $3^{rd}$ group for the first plurality of ports, and may select and report the $1^{st}$ and $4^{th}$ group for the second plurality. However, the port selection/report within each group same in each group, e.g., port 1 and 2 are selected and reported for all groups. Considering that the group index corresponds to FD basis, and the port index in each group corresponds to an SD basis, This may correspond to the first and second SD basis are selected for both the first polarization and third polarization, while the $1^{st}$ and $3^{rd}$ FD bases are selected for the first and second SD basis on the first polarization, the $1^{st}$ and $4^{th}$ FD bases are selected for the first SD and second basis on the second polarization. In some examples, the group selection may be specific and the port selection in the groups is group specific or group-pair specific.

In some examples, in the case of CSI-RS resource organization, the port selection may be common for CSI-RS ports in both portions for a CSI-RS resource (e.g., such shown in the example resources in FIG. 6A and FIG. 6B). For example, the same SD and FD are common in CSI-RS ports in both polarizations associated with a CSI-RS resource. In some examples, the UE may select one or more resources and report via CRI. Further, the UE may select ports within each resource and the port selection may be resource-common and also common for both portions (e.g., polarizations). For example, UE may select and report $1^{st}$ and $3^{rd}$ resource. Then, UE may select and report the $1^{st}$ and $2^{nd}$ port for the first plurality of ports, and this also indicates that the $1^{st}$ and 2nd port for the second plurality are selected for the first CSI-RS resource, also this may indicate that $1^{st}$ and $2^{nd}$ port for the first and second plurality are selected for the first CSI-RS resource. Considering each resource is associated with a specific SD basis and each port is associated with a specific FD basis, this implies that the $1^{st}$ and $3^{rd}$ SD basis and $1^{st}$ and $2^{nd}$ FD basis are selected. In some examples, the UE may select ports within each resource and the port selection may be resource-common but specific for both portions (e.g., polarizations). For example, UE may select and report $1^{st}$ and $3^{rd}$ resource. Then, UE may select and report the $1^{st}$ and $2^{nd}$ port for the first plurality of ports in the first resource, and select and report the $1^{st}$ and $4^{th}$ port for the second plurality of ports in the first resource. This also indicates that the $1^{st}$ and $2^{nd}$ port for the first plurality of ports in the third resource are select, and the $1^{st}$ and $4^{th}$ port for the second plurality of ports in the third resource are selected. Considering each resource is associated with a specific SD basis and each port is associated with a specific FD basis, this implies that the $1^{st}$ and $3^{rd}$ SD basis are selected, while for the $1^{st}$ SD basis, the $1^{st}$ and $2^{nd}$ FD basis are selected for the first polarization and $1^{st}$ and $4^{th}$ FD basis are selected for the second polarization; for the $3^{rd}$ SD basis, the $1^{st}$ and 2nd FD basis are selected for the first polarization and $1^{st}$ and $4^{th}$ FD basis are selected for the second polarization. In some examples, the UE may select ports within each resource and the port selection may be resource-specific but common for both portions (e.g., polarizations). For example, UE may select and report $1^{st}$ and $3^{rd}$ resource. Then, UE may select and report the $1^{st}$ and $2^{nd}$ port for the first plurality of ports in the first resource, and select and report the 2nd and $3^{rd}$ port for the first plurality of ports in the third resource. This also indicates that the $1^{st}$ and $2^{nd}$ port for the second plurality of ports in the first resource are select, and the $2^{nd}$ and $3^{rd}$ port for the second plurality of ports in the third resource are selected. Considering each resource is associated with a specific SD basis and each port is associated with a specific FD basis, this implies that the $1^{st}$ and $3^{rd}$ SD basis are selected, while for the $1^{st}$ SD basis, the $1^{st}$ and $2^{nd}$ FD basis are selected for the both polarizations; for the $3^{rd}$ SD basis, the $2^{nd}$ and $3^{rd}$ FD basis are selected for the both polarizations. In some examples, the UE may select ports within each resource and the port selection may be resource-specific and also specific for both portions (e.g., polarizations). For example, UE may select and report $1^{st}$ and $3^{rd}$ resource. Then, UE may select and report the $1^{st}$ and 2nd port for the first plurality of ports in the first resource, and select and report the $1^{st}$ and $3^{rd}$ port for the second plurality of ports in the first resource. Also, the UE may select and report the $1^{st}$ and $4^{th}$ port for the first plurality of ports in the second resource, and the $2^{nd}$ and $4^{th}$ port for the second plurality of ports in the third resource. Considering each resource is associated with a specific SD basis and each port is associated with a specific FD basis, this implies that the $1^{st}$ and $3^{rd}$ SD basis are selected. Then, for the $1^{st}$ SD basis, the $1^{st}$ and $2^{nd}$ FD $b_{as}$ is are selected for the first polarization and $1^{st}$ and $3^{rd}$ FD $b_{as}$ is are selected for the second polarization; for the $3^{rd}$ SD basis, the $1^{st}$ and $4^{th}$ FD basis are selected for the first polarization, while the $2^{nd}$ and $4^{th}$ FD basis are selected for the second polarization.

After the group based selection, the BS may further configure a number of CSI-RS ports for the UE to use for linear combination, e.g., $K_0 \leq 2LM$, where L (resp. M) may corresponds the number of groups/resources to be selected, while M (resp. L) correspond to the number of port to be selected in each resource/group. $K_0$ may be configured rank-common or rank-specific (e.g., different number of ports for different ranks). In some examples, the number of CSI-RS ports for higher rank can be derived from the number of CSI-RS ports to use for lower rank. In some cases, when rank-specific, M or L may be configured number for rank 1 and rank 2, while a smaller M or L may be configured for higher ranks to have comparable overhead for different ranks.

The UE reports the actual number of non-zero CSI-RS ports $K_{NZ} \leq K_0$ selected for combination. The UE can report the (actual non-zero) port selection $v_{i_k}$ freely from the total P ports. The selection may be polarization-common or polarization-specific. The selection may be layer-common or layer-specific.

According to certain aspects, the BS may configure a subset of ports from the total ports. In this case, the port selection for each layer of this rank should be selected from within the configured subset. The configuration may be rank-specific.

Figure 7:
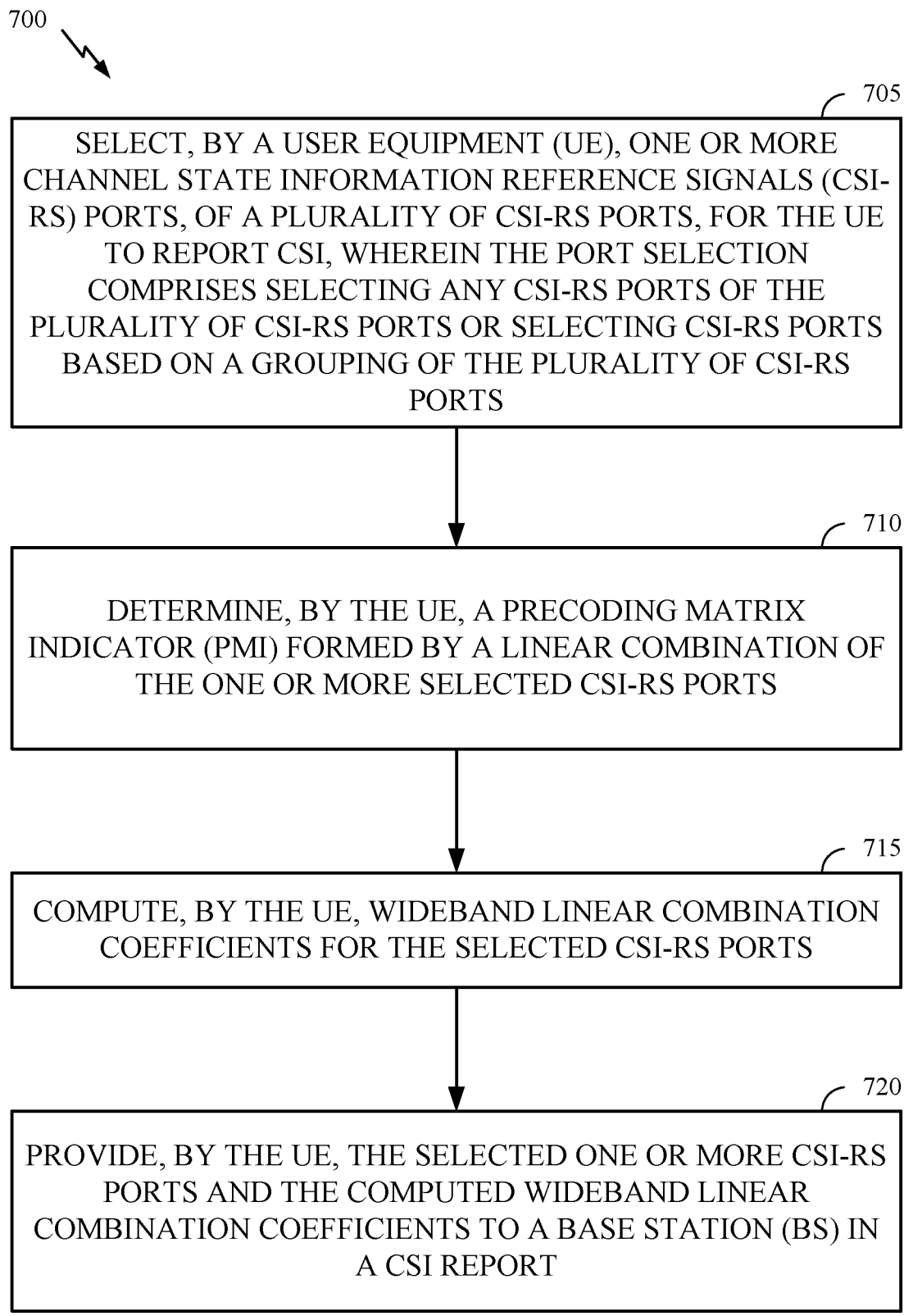
FIG. 7 is a flow diagram illustrating example operations for wireless communication by a UE, in accordance with certain aspects of the present disclosure.

FIG. 7 is a flow diagram illustrating example operations 700 for wireless communication, in accordance with certain aspects of the present disclosure. The operations 700 may be performed, for example, by a UE (e.g., such as a UE 120a in the wireless communication network 100). The operations 700 may be implemented as software components that are executed and run on one or more processors (e.g., controller/processor 280 of FIG. 2). Further, transmission and reception of signals by the UE in the operations 700 may be enabled, for example, by one or more antennas (e.g., antennas 252 of FIG. 2). In certain aspects, the transmission and/or reception of the signals by the UE may be implemented via a bus interface of one or more processors (e.g., controller/processor 280) obtaining and/or outputting the signals.

The operations 700 may begin, at 705, by selecting one or more CSI-RS ports, of a plurality of CSI-RS ports, for the UE to report CSI. The port selection includes selecting any of the plurality of CSI-RS ports or selecting CSI-RS ports based on a grouping of the plurality of CSI-RS ports. In some examples, the port selection is polarization-specific or polarization-common. In some examples, the number of CSI-RS ports may be more than 32. In some examples, the UE receives a configuration from the BS of a subset of the plurality of CSI-RS ports and selects the one or more CSI-RS ports from the configured subset of CSI-RS ports. The subset may be configured rank-specific.

According to certain aspects, the UE selects any of the plurality of CSI-RS ports (e.g., for a polarization-specific port selection).

According to certain aspects, the UE determines the grouping of the plurality of CSI-RS ports and selects the one or more CSI-RS ports based, at least in part, on the grouping (e.g., for a polarization-common port selection). In some examples, the groupings are configured at the UE by the BS or based on the wireless standards. In some examples, the UE determines the groupings includes determining a first portion (e.g., half) of the plurality of CSI-RS ports are associated with a first polarization and a second portion (e.g., the other half) of the plurality of CSI-RS ports are associated with a second polarization.

In some examples, the UE determines a first plurality of groups of the CSI-RS ports in the first portion and determines a second plurality of groups of the CSI-RS ports in the second portion. In some examples, each group, within each of the first and second plurality of groups, is associated with a particular SD or FD basis (which may be transparent to the UE). In some examples, within each of the groups, each CSI-RS port is associated with a particular one of the other one of the SD or FD basis.

In some examples, the UE receives a configuration from the BS of a number of CSI-RS port groups for the UE to report linear combination coefficients. In this case, the UE may select the one or more CSI-RS ports from up to the configured number of CSI-RS port groups. In some examples, the UE receives a configuration of a number of CSI-RS ports, within each CSI-RS port group, for the UE to report linear combination coefficients. In this case, the UE may select up to the configured number of CSI-RS ports from each of the selected CSI-RS port groups.

In some examples, the UE determines a plurality of CSI-RS resources. Each CSI-RS resource includes the first and second portions of the CSI-RS ports. The UE may receive a configuration from the BS of a number of CSI-RS resources for the UE to report linear combination coefficients and select the one or more CSI-RS ports from up to the configured number of CSI-RS resources. Each CSI-RS resource may correspond to a particular SD or FD basis. Within each CSI-RS resource: each CSI-RS port in the first portion of CSI-RS ports is associated with a particular one of the other one of the SD or FD basis; and each CSI-RS port in the second portion of CSI-RS ports is associated with the different one of the other one of the SD or FD basis.

In some examples, the UE receives a configuration from the BS of a number of CSI-RS ports, within each CSI-RS resource, for the UE to report linear combination coefficients. In this case, the UE selects up to configured number of CSI-RS ports from each of the selected CSI-RS resources. The UE can provide the selected CSI-port ports by indicating one or more CSI-RS resource index, one or more CSI-RS port index, or both, indicating the selected CSI-RS ports associated with the CSI report.

At 710, the UE determines a PMI formed by a linear combination of the one or more selected CSI-RS ports.

At 715, the UE computes at least wideband linear combination coefficients for the selected CSI-RS ports. In some examples, the UE computes the wideband linear combination coefficients across all FD units for each selected CSI-RS port.

At 720, the UE provides the selected one or more CSI-RS ports and the computed wideband linear combination coefficients to a BS in a CSI report. In some examples, the UE provides the selected one or more CSI-RS ports by indicating one or more CSI-RS port group index, one or more CSI-RS port index, or both. In some examples, the UE receives a configuration from the BS of a maximum number of CSI-RS ports per-layer or per-rank for the UE to report linear combination coefficients. In some examples, the UE reports to the BS an indication of a number of non-zero CSI-RS ports, equal to or less than the configured maximum number of CSI-RS ports, associated with the CSI report. In some examples, the UE reports to the BS an indication of the selected non-zero CSI-RS ports, equal to or less than the configured maximum number of CSI-RS ports, associated with the CSI report.

In some examples, the FD unit size is smaller than a subband.

Figure 8:
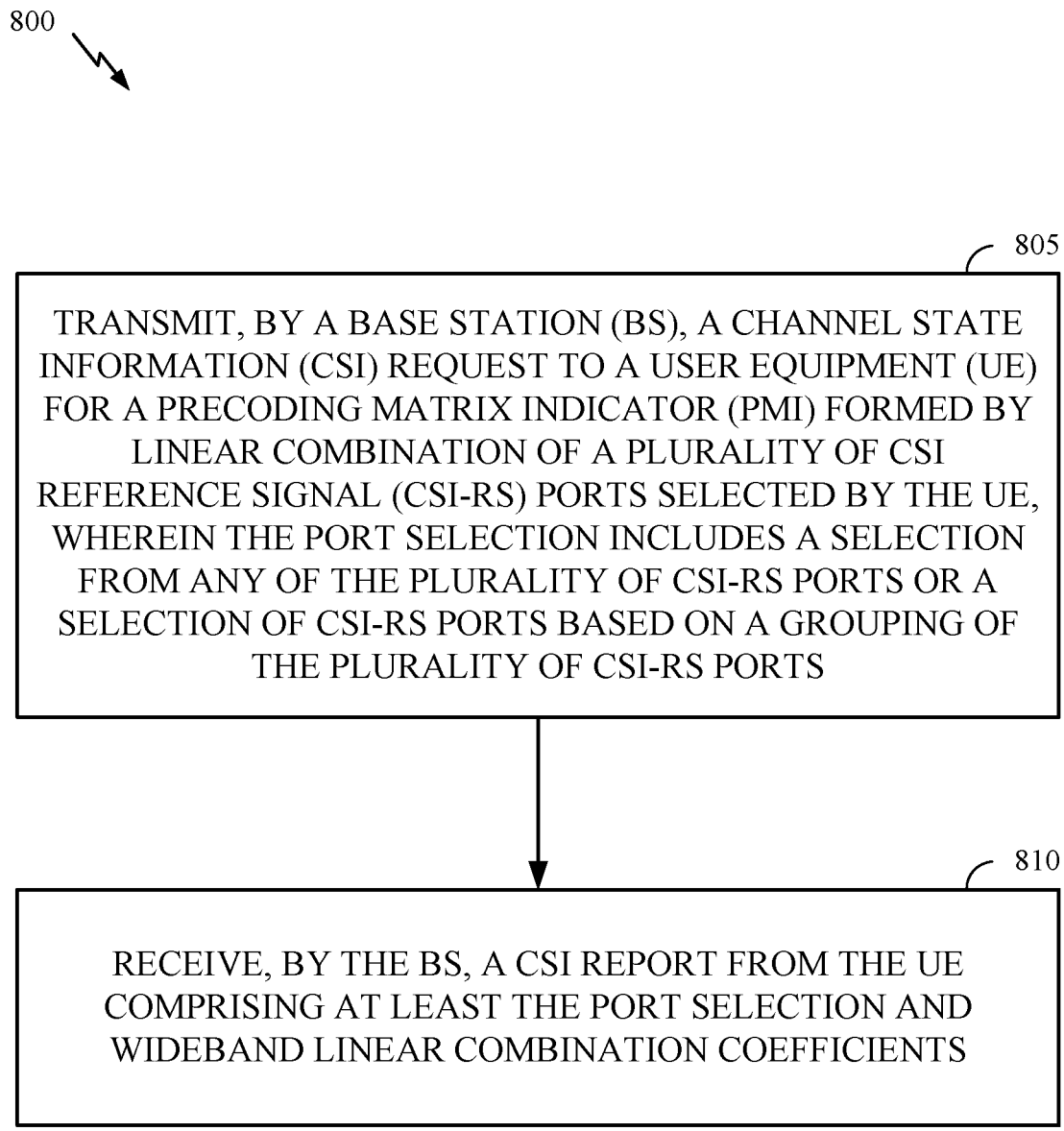
FIG. 8 is a flow diagram illustrating example operations for wireless communication by a BS, in accordance with certain aspects of the present disclosure.

FIG. 8 is a flow diagram illustrating example operations 800 for wireless communication, in accordance with certain aspects of the present disclosure. The operations 800 may be performed, for example, by a BS (e.g., such as the BS 110*a* in the wireless communication network 100). The operations 800 may be complimentary operations by the BS to the operations 700 performed by the UE. The operations 800 may be implemented as software components that are executed and run on one or more processors (e.g., controller/processor 240 of FIG. 2). Further, transmission and reception of signals by the BS in operations 700 may be enabled, for example, by one or more antennas (e.g., antennas 234 of FIG. 2). In certain aspects, the transmission and/or reception of the signals by the BS may be implemented via a bus interface of one or more processors (e.g., controller/processor 240) obtaining and/or outputting the signals.

The operations 800 may begin, at 805, by transmitting a CSI request to a UE for a PMI formed by linear combination of a plurality of CSI-RS ports selected by the UE. The port selection includes selection from any of the plurality of CSI-RS ports or a selection of CSI-RS ports based on a grouping of the plurality of CSI-RS ports. In some examples, the port selection is polarization-specific or polarization-common based on a grouping of the plurality of CSI-RS ports. Precoders for the CSI-RS ports may include a specific SD and FD basis to emulate the CSI-RS. Different precoders may be associated with different SD basis, different FD basis, or both.

At 810, the BS receives a CSI report from the UE comprising at least the port selection and wideband linear combination coefficients.

A first portion of the plurality of CSI-RS ports may be associated with a first polarization and a second portion of the plurality of CSI-RS ports may be associated with a second polarization. In some examples, corresponding CSI-RS ports in the first and second portions have a same precoder. In some examples, corresponding CSI-RS ports in the first and second portions different precoders.

According to certain aspect, the BS determines the grouping of CSI-RS ports by grouping the CSI-RS ports in the first portion into a first plurality of groups and grouping CSI-RS ports in the second portion into a second plurality of groups. Each group, within each of the first and second plurality of groups, can be associated with a common particular SD or FD basis and, within each of the groups, all CSI-RS ports are associated with a particular one of the other one of the SD or FD basis. The BS may configure the UE with a number of CSI-RS port groups for the UE to report linear combination coefficients. The BS may configure the UE with a number of CSI-RS ports, within each CSI-RS port group, for the UE to report linear combination coefficients. The CSI report may include one or more CSI-RS port group index, one or more CSI-RS port index, or both, indicating CSI-RS ports associated with the CSI report.

According to certain aspects, the BS determines the grouping of CSI-RS ports by determining a plurality of CSI-RS resources. Each CSI-RS resource may include the first and second portions of the CSI-RS ports and a particular SD or FD basis. Within each resource, each CSI-RS port in the first portion of CSI-RS ports can be associated with a particular one of the other one of the SD or FD basis and each CSI-RS port in the second portion of CSI-RS ports is associated with the particular one of the other one of the SD or FD basis. In some examples, the BS configures the UE with a number of CSI-RS resources for the UE to report linear combination coefficients. In some examples, the BS configures the UE with a number of CSI-RS ports, within each CSI-RS resource, for the UE to report linear combination coefficients. The CSI report may include one or more resource index, one or more CSI-RS port index, or both, indicating CSI-RS ports associated with the CSI report.

According to certain aspects, the BS may configure the UE with a maximum number of CSI-RS ports per-layer or per-rank for the UE to report linear combination coefficients. The CSI report may include an indication of a number of non-zero CSI-RS ports, equal to or less than the configured maximum number of CSI-RS ports, associated with the CSI report. The CSI report may include an indication of the selected non-zero CSI-RS ports, equal to or less than the configured maximum number of CSI-RS ports, associated with the CSI report.

According to certain aspects, the BS may configure the UE with a subset of the plurality of CSI-RS ports from which the UE can select up to the maximum number of CSI-RS ports per-layer. The subset may be configured rank-specific.

According to certain aspects, the plurality of CSI-RS ports may include more than 32 CSI-RS ports.

According to certain aspects, the FD unit size may be smaller than a subband.

Figure 9:
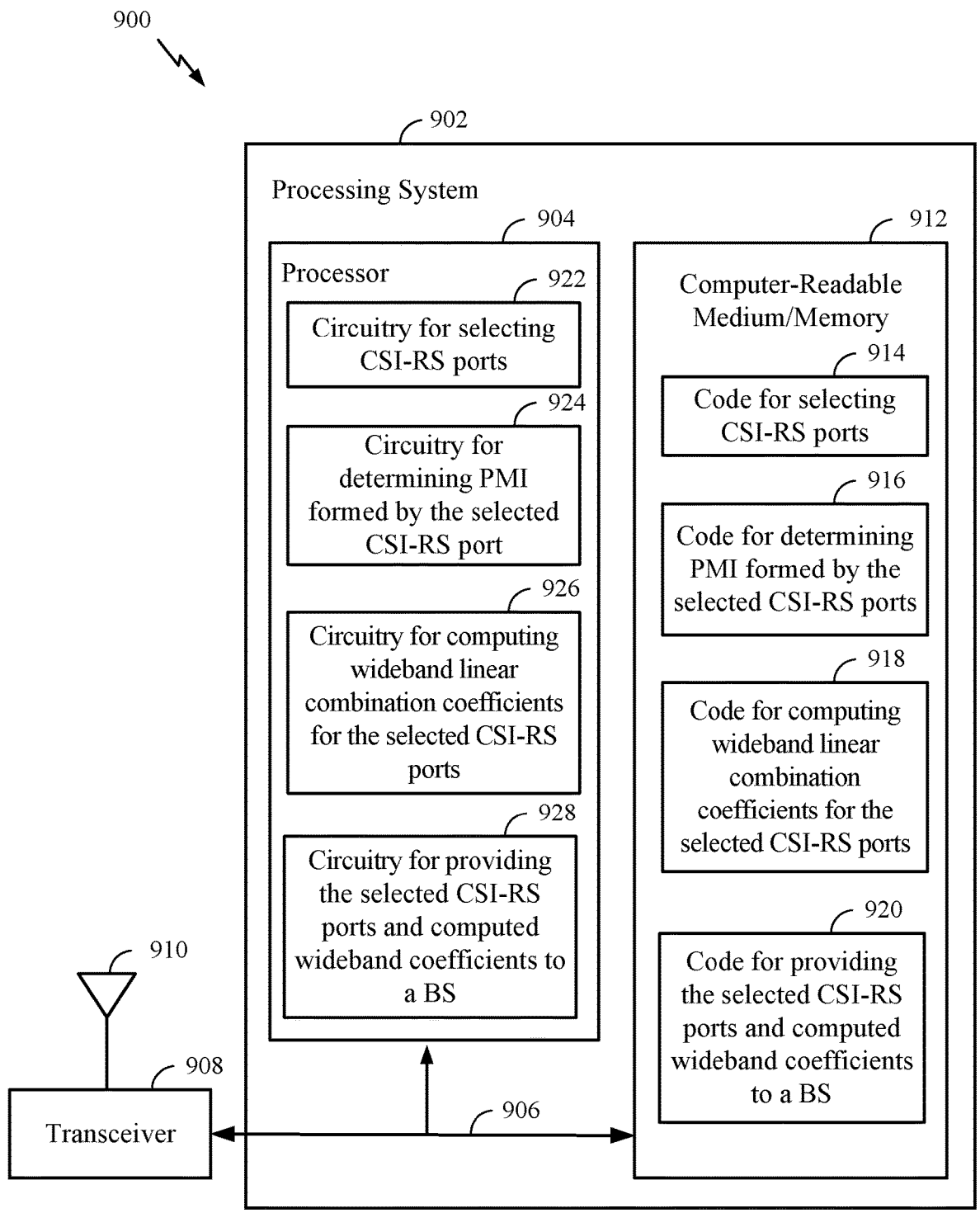
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 7. The communications device 900 includes a processing system 902 coupled to a transceiver 908 (e.g., a transmitter and/or a receiver). The transceiver 908 is configured to transmit and receive signals for the communications device 908 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 7, or other operations for performing the various techniques discussed herein for port selection for channel state feedback with analog feedforward. In certain aspects, computer-readable medium/memory 912 stores code 914 for selecting CSI-RS ports; code 916 for determining PMI formed by the selected CSI-RS ports; code 918 for computing wideband linear combination coefficients for the selected CSI-RS ports; and code 920 for providing the selected CSI-RS ports and computed wideband coefficients to a BS, in accordance with aspects of the present disclosure. In certain aspects, the processor 904 has circuitry configured to implement the code stored in the computer-readable medium/memory 912. The processor 904 includes circuitry 922 for selecting CSI-RS ports; circuitry 924 for determining PMI formed by the selected CSI-RS ports; circuitry 926 for computing wideband linear combination coefficients for the selected CSI-RS ports; and circuitry 928 for providing the selected CSI-RS ports and computed wideband coefficients to a BS, in accordance with aspects of the present disclosure.

Figure 10:
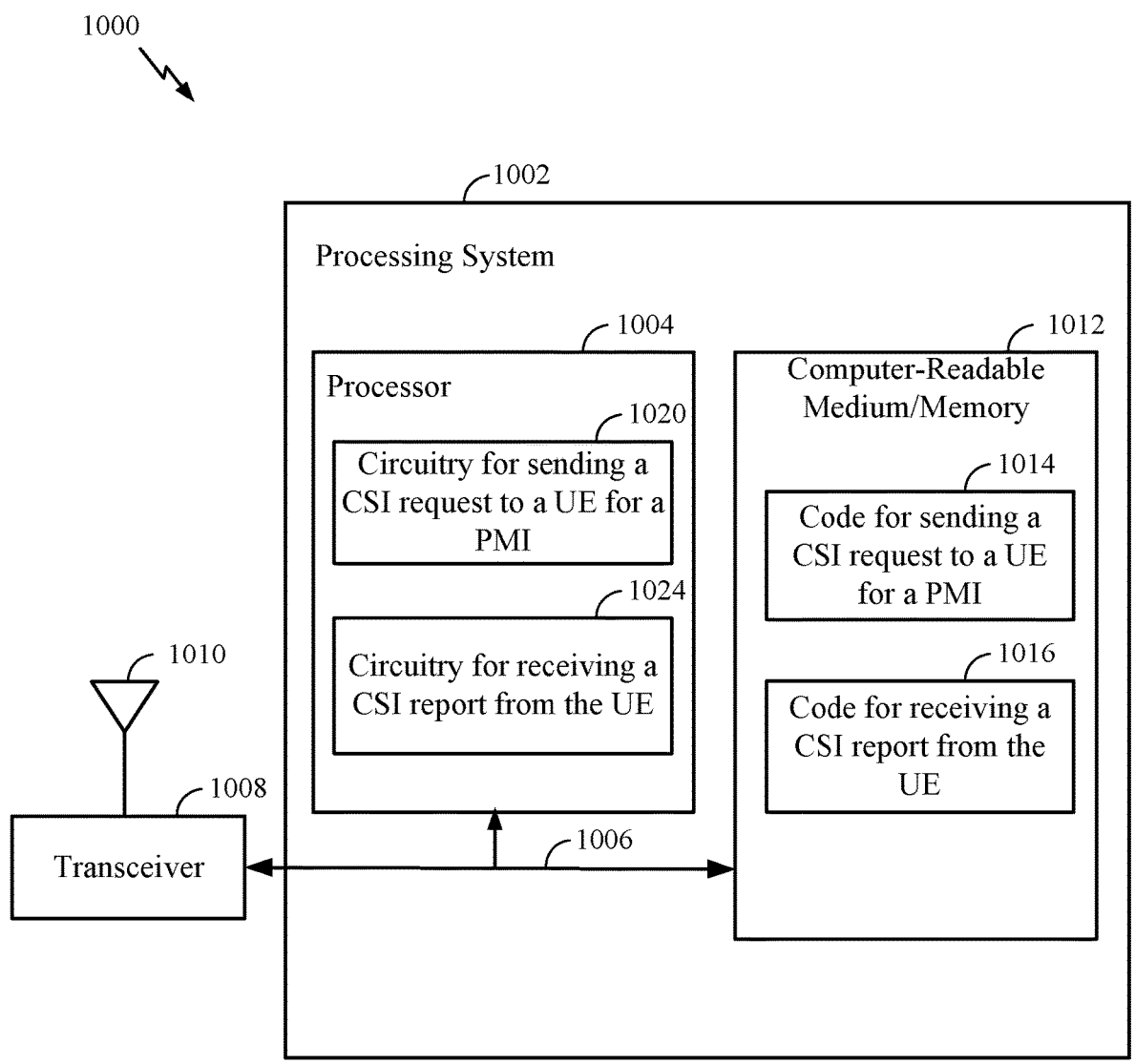
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 8. The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 8, or other operations for performing the various techniques discussed herein for port selection for channel state feedback with analog feedforward. In certain aspects, computer-readable medium/memory 1012 stores code 1014 for transmitting a CSI request to a UE for a PMI; and code 1016 for receiving a CSI report from the UE, in accordance with aspects of the present disclosure. In certain aspects, the processor 1004 has circuitry configured to implement the code stored in the computer-readable medium/memory 1012. The processor 1004 includes circuitry 1018 for transmitting a CSI request to a UE for a PMI; and circuitry 1020 for receiving a CSI report from the UE, in accordance with aspects of the present disclosure.

Example Mapping of Virtual Ports to CSI-RS Port

As noted above, a BS (e.g., such as the BS 110*a* in the wireless communication network 100) may configure a number of CSI-RS port groups or a number of CSI-RS resources from which a UE (e.g., such as the UE 120*a* in the wireless communication network 100) may select CSI-RS ports. In some cases, to obtain good performance, Rel-17 FDD reciprocity based CSI may use a larger number of SD-FD bases pair (e.g., 32 or 64) to perform CSI-RS precoding. An SD-FD bases pair may correspond to a virtual port.

The UE may select the CSI-RS ports to report CSI. In some aspects, the UE may execute one-to-one mapping between virtual port and CSI-RS port to perform port-selection CSI measurement and reporting. In some aspects, the UE may execute many-to-one mapping between the virtual ports and the CSI-RS port to perform the port-selection CSI measurement and reporting.

One-to-One Mapping:

According to certain aspects, the UE may execute the one-to-one mapping technique where each CSI-RS port is precoded (or beamformed) via a particular virtual port. In the one-to-one mapping technique, the UE may select the CSI-RS ports across a plurality of CSI-RS resources to report the CSI. This may enable the selection of more than 32 ports (e.g., 64 virtual ports or SD-FD bases pairs), because current specification may only support 32 ports per CSI-RS resource. For example, the UE may freely select the CSI-RS ports from any and from multiple of the CSI-RS resources. In one non-limiting example, each CSI-RS resource of the plurality of CSI-RS resources may include multiple CSI-RS ports. In another non-limiting example, each CSI-RS resource of the plurality of CSI-RS resources may be mapped to a virtual port (e.g., a pair of a SD and FD basis). In another non-limiting example, each CSI-RS resource of the plurality of CSI-RS resources may be divided into at least two portions. In another non-limiting example, to save CSI-RS overhead, each CSI-RS resource of the plurality of CSI-RS resources may be associated with a density lower than 1. The density may be 0.5 or 0.25, which may mean that the CSI-RS ports are transmitted per two-RB or per four-RB.

In some examples, the UE may select the CSI-RS ports across $K_s$ CSI-RS resources. Each CSI-RS resource may include $P_{CSI\text{-}RS}$ ports. The UE may then (freely) select X ports from a total number of ports (i.e., $K_s * P_{CSI\text{-}RS}$ ports). In some examples, the $P_{CSI\text{-}RS}$ ports in each CSI-RS resource may be divided into two portions. A first portion comprises ports transmitted from a first polarization, while a second portion comprises ports transmitted from a second polarization. The UE may then (freely) select X ports from $K_s * P_{CSI\text{-}RS}/2$ ports from the first portion and the same port location in the second portion are also selected. Values corresponding to $K_s$ and $P_{CSI\text{-}RS}$ may vary. In one non-limiting example, $K_s$ may be 2 and $P_{CSI\text{-}RS}$ may be 32. In another non-limiting example, $K_s$ may be 64 and $P_{CSI\text{-}RS}$ may be 1. In another non-limiting example, $K_s$ may be 4 and $P_{CSI\text{-}RS}$ may be 8.

In some examples, the UE may further determine a resource grouping or pairing across $K_s$ CSI-RS resources, and perform port-selection within each group or pair. In some example, UE may determine N resources are grouped, resulting in $K_s/N$ groups. In some example, UE may determine two resources as a resource pair, and the number of pairs is equal to $K_s/2$. In some examples, UE may receive a configuration indicating the valid groups or pairs from all the possible groups or pairs. In some examples, the configuration may indicate S groups out of the $$\binom{K_s}{N}$$

total pairs are valid via a $$\binom{K_s}{N}\text{-bit}$$

bitmap or via $$\left(\binom{K_s}{N}\atop S\right)\text{-bit}$$

combinatorial numbers. In some examples, the configuration may indicate S pairs out of the $$\binom{K_s}{2} = (K_s - 1) \times K_s/2$$

total pairs are valid via $$\binom{K_s}{2}\text{-bit}$$

bitmap or $$\left(\binom{K_s}{N}\atop S\right)\text{-bit}$$

combinatorial numbers. In some examples, UE may determine every two resources are paired based on the order of the resources. In some examples, the UE may determine every N resources are grouped based on the order of the resources. For instance, in the trigger state configuration, a CSI report may be associated with a NZP CSI-RS resource set comprising resource ID0, ID1, ID2 and ID3. The UE may determine CSI-RS resource ID0 and ID1 are paired and CSI-RS resource ID2 and ID3 are paired. In some cases, the UE may further report an indication indicating the preferred CSI-RS resource group(s) or pair(s). The indicator may be provided via multiple CSI-RS resource indicator, which indicates a resource-group or resource-pair rather than single resource. The bitwidth of the indicator may depend on the number of possible groups or possible pairs. The reported PMI comprising port-selection and linear combination coefficients is associated with the resources and ports in the resource group or pair. In some cases, the port-selection across ports of multiple resources and the resource grouping/pairing only applies to the case where the total number ports in each group is larger than 32 (e.g., total number of ports in each group/pair is 48 and 64 resulted by 24+24 or 32+32, respectively).

In some examples, a density value associated with each CSI-RS resource may be 0.5. For example, the CSI-RS in each CSI-RS resource may be transmitted only on even resource blocks (RBs) or only on odd RBs. In some examples, a density value of each CSI-RS resource may be less than be 0.5. For example, if density is equal to 0.25, the CSI-RS in each CSI-RS resource may be transmitted only on RB-comb 1, i.e., RB0, RB4, RB8, etc., or only on RB-comb 2, i.e., RB1, RB5, RB9, etc., or only on RB-comb 3, i.e., RB2, RB6, RB10, etc., or only on RB-comb 4, i.e., RB3, RB7, RB11, etc. When the density value of each CSI-RS resource may be less than be 0.5, port selection may only be applied to Rel-17 enhanced port-selection codebooks.

In some examples, the CSI-RS ports in the plurality of CSI-RS resources may be reindexed. The reindexing of these CSI-RS ports may be based on a resource index. For instance, to calculate CQI, p-th CSI-RS port in m-th CSI-RS resource may be re-indexed as $3000+m*P_{CSI\text{-}RS}+p$. In some examples, a virtual physical downlink shared channel (PDSCH) may be used to calculate the CQI. The virtual PDSCH may be generated as:

$$\begin{bmatrix} y^{(3000)} \\ \vdots \\ y^{(3000+P_{CSIRS}-1)} \\ y^{(3000+P_{CSIRS})} \\ \vdots \\ y^{(3000+2P_{CSIRS}-1)} \\ \vdots \\ y^{(3000+(M-1)\cdot P_{CSIRS})} \\ \vdots \\ y^{(3000+M\cdot P_{CSIRS}-1)} \end{bmatrix} = W \begin{bmatrix} x^{(0)} \\ \vdots \\ x^{(v-1)} \end{bmatrix}$$

where W may contain a PMI, which may be mapped to virtual CSI-RS ports or CSI-RS ports after reindexing.

In certain aspects, the UE may receive a resource mapping configuration, which may indicate a combined CSI-RS resource. The combined CSI-RS resource may include one or more component CSI-RS resources. Each component CSI-RS resource may include multiple CSI-RS ports. In some examples, the combined CSI-RS resource may include a number, P, of CSI-RS ports that may be formed by the one or more component CSI-RS resources. Each of the component CSI-RS resources may include fewer than P CSI-RS ports (e.g., there may be N CSI-RS resources with $P_1$, $P_2, \ldots, P_N$ CSI-RS ports and the number of CSI-RS ports in the combined CSI-RS resource may be given by $\Sigma_{k=1}^{N} P_k = P$). In the resource mapping configuration, the UE may receive a number, N, of resource mapping configurations. Each resource mapping configuration may include information, such as a number of CSI-RS ports, a code division multiplexing (CDM) type, a frequency domain allocation (such as RE location of each CDM group, starting RB, and/or total bandwidth of CSI-RS), a time domain allocation (such as a first starting symbol and a second starting symbol), a power control offset, a density (e.g., the CSI-RS ports are transmitted every RBs or every two RBs or every four RBs), etc. The UE may receive first $P_1$ CSI-RS ports following a first resource mapping configuration, then receive second $P_2$ CSI-RS ports (after the first $P_1$ ports) following a second resource mapping configuration, and then receive $P_k$ CSI-RS ports (after the first $P_1+P_2+\ldots+P_{k-1}$ ports) following k-th resource mapping configuration. In an illustrative example, the resource mapping configuration may include 48 CSI-RS port resources configured via 2 resource mappings, each of the resource mapping including a 24 CSI-RS port resource with a density of 0.5. The resource mapping may include 64 CSI-RS port resources configured via 2 resource mappings, each of the resource mappings including a 32 CSI-RS port resource with a density of 0.5. The CSI-RS ports transmitted according to the k-th resource mapping configuration may be indexed as $p=3000+s+jL+\Sigma_{k'=1}^{k-1} P_{k'}$, where s is a CDM sequence index, j is a CDM group index per the k-th resource mapping configuration, L={1,2,4,8} is a number of CSI-RS ports per CDM group, and $P_{k'}$ is a number of CSI-RS ports given by the k'-th resource mapping configuration. If all resource mapping configurations include a same number of CSI-RS ports P', then the CSI-RS ports transmitted according to the k-th resource mapping configuration may be indexed as $p=3000+s+jL+(k-1)\times P'$.

Many-to-One Mapping:

The UE may execute the many-to-one mapping technique. In the many-to-one mapping technique, each CSI-RS port is precoded (or beamformed) via multiple virtual ports (e.g., SD-FD bases pairs), and the UE may select the CSI-RS ports within one of the plurality of CSI-RS resources to report the CSI. In one non-limiting example, each CSI-RS resource of the plurality of CSI-RS resources may include the multiple CSI-RS ports. In another non-limiting example, each CSI-RS resource of the plurality of CSI-RS resources may be mapped to multiple virtual ports (e.g., multiple pairs of SD and FD bases).

In some examples, the UE may receive a first number of CSI-RS ports within a CSI-RS resource of the plurality of CSI-RS resources. The UE may determine whether the first number of CSI-RS ports are mapped to a second number of virtual CSI-RS ports and each virtual CSI-RS port is precoded via a pair of SD and FD bases. The second number may be greater than the first number. In some cases, the UE may determine whether each of the first number of CSI-RS ports is mapped to more than one of the second number of virtual CSI-RS ports (e.g., pairs of SD and FD bases). When each of the first number of CSI-RS ports may be mapped to more than one of the second number of virtual CSI-RS ports (e.g., SD-FD bases pairs), the UE make select one or more virtual CSI-RS ports (e.g., SD-FD bases pairs) from the second number of virtual CSI-RS ports (i.e., SD-FD bases pairs). The UE may select the one or more virtual CSI-RS ports by first selecting the one or more CSI-RS ports and then selecting the virtual CSI-RS ports associated with the selected one or more CSI-RS ports.

In some examples, the UE may select the CSI-RS ports in one of Ks resources (such as the CSI-RS resources). Each resource may include $P_{CSI-RS}$ ports (such as the CSI-RS ports). Each of the $P_{CSI-RS}$ ports may be mapped to multiple virtual CSI-RS ports (e.g., pairs of SD and FD bases). To perform (virtual) port selection in one CSI-RS resource, the UE may execute the many-to-one mapping technique. The UE may then determine that the $P_{CSI-RS}$ are mapped to $P>P_{CSI-RS}$ virtual ports, and select X virtual ports from the P virtual ports. In some examples, each $P_{CSI-RS}$ port may be divided into two portions. A first portion comprises virtual ports transmitted from a first polarization, while a second portion comprises virtual ports transmitted from a second polarization. Similarly, the virtual ports mapped to the first portion of the $P_{CSI-RS}$ ports are transmitted from the first polarization, while the virtual ports mapped to the second portion of the $P_{CSI-RS}$ ports are transmitted from the second polarization. The UE may then determine P/2 virtual ports from the first $P_{CSI-RS}/2$ ports, and select X virtual ports from the P/2 virtual ports and the same virtual port location in the second portion are selected as well.

Pair Grouping:

In some aspects, one or more CSI-RS virtual ports (i.e., pairs of SD-FD bases) in a same group may be mapped to a same CSI-RS port. In some aspects, the one or more CSI-RS virtual ports in different groups may be mapped to different CSI-RS ports. In some examples, 64 virtual CSI-RS ports may be divided into 32 groups. There may be two ports in each group, such as a virtual CSI-RS port 0 and a virtual CSI-RS port 32 in the first group, a virtual CSI-RS port 1 and a virtual CSI-RS port 33 in the second group, etc. According to this pair grouping method, as shown in FIG. 11, CSI-RS Port 3000 may be associated with the virtual CSI-RS port 0 and 32 (i.e., pair 0 and 32 of SD-FD bases), and CSI-RS port 3001 may be associated with the virtual CSI-RS port 1 and 33 (i.e., pair 1 and 33 of SD-FD bases), etc.

In some aspects, one or more virtual CSI-RS ports mapped to a same CSI-RS port may be transmitted on different resource blocks. For instance, a first CSI-RS port on a first set of resource blocks may correspond to a first virtual CSI-RS port (i.e., may be transmitted via a first pair of SD-FD bases), and the first CSI-port on a second set of resource blocks may correspond to a second virtual CSI-RS port (i.e., may be transmitted via a second pair of SD-FD bases). In some examples, there may be 32 ports (P_C-SIRS=32 ports) and 64 virtual CSI-RS ports (i.e., P=64 pairs of SD-FD bases). According to this pair grouping method, as shown in FIG. 11, the CSI-RS ports 3000-3001 on an even resource block may correspond to virtual CSI-RS ports 0-31 (i.e., may be transmitted via pairs of SD-FD bases 0-31), and the CSI-RS ports 3000-3001 on an odd resource block may correspond to virtual CSI-RS ports 32-63 (i.e., may be transmitted via pairs of SD-FD bases 32-63), respectively.

In some aspects, one or more pairs of SD-FD bases in a same group transmitted to a same set of resource blocks may be mapped to different CSI-RS ports. In some examples, group 0 (resp. 1) may be associated with virtual CSI-RS port 0-31 (i.e., pairs 0-31 of SD-FD bases) (resp. virtual CSI-RS port 32-63 (i.e., pairs 32-63 of SD-FD bases)), which may be transmitted on even (resp. odd) resource block that may be mapped to CSI-RS ports 0-31.

In some cases, the $P_{CSI-RS}$ CSI-RS ports in one resource is mapped to $P=N*P_{CSI-RS}$ virtual ports (i.e., precoded via P SD-FD bases pairs). The $P_{CSI-RS}$ CSI-RS ports transmitted on different RB comb may be mapped to different virtual CSI-RS ports. In some cases, the $P_{CSI-RS}$ CSI-RS ports on RB comb 1, i.e., RB0, RBN, RB 2N, etc, are mapped to virtual ports $0-P_{CSI-RS}-1$; the $P_{CSI-RS}$ CSI-RS ports on RB comb 2, i.e., RB1, RBN+1, RB 2N+1, etc., may be mapped to virtual ports $P_{CSI-RS}$ to $2P_{CSI-RS}-1$; the $P_{CSI-RS}$ CSI-RS ports on RB comb n, i.e., RBn−1, RBN+n, RB 2N+n, etc., may be mapped to virtual ports $(n-1)*P_{CSI-RS}$ to $n*P_{CSI-RS}-1$.

In some aspects, the UE may (freely) select any one or more virtual ports (i.e., pairs of SD-FD bases) for CSI measurement and reporting. For this purpose, the UE may determine CSI-RS port index based on the mapping between the CSI ports and the virtual CSI-RS ports (i.e., pairs of SD-FD bases). In some examples, as per the CSI-RS port index, p-th CSI-RS port transmitted on m-th set of resource blocks may be re-indexed as virtual port 3000+m*P+p. The UE may use the virtual CSI-RS port index to select the virtual CSI-RS ports (e.g., pairs of SD-FD bases) to report the CSI. In some examples, a PDSCH may be used for calculation of CQI. The virtual PDSCH may be generated as:

$$\begin{bmatrix} y^{(3000)} \\ \vdots \\ y^{(3000+P_{CSIRS}-1)} \\ y^{(3000+P_{CSIRS})} \\ \vdots \\ y^{(3000+2P_{CSIRS}-1)} \\ \vdots \\ y^{(3000+(M-1)\cdot P_{CSIRS})} \\ \vdots \\ y^{(3000+M\cdot P_{CSIRS}-1)} \end{bmatrix} = W \begin{bmatrix} x^{(0)} \\ \vdots \\ x^{(v-1)} \end{bmatrix}$$

where W may contain a port-selection PMI comprising a port-selection matrix and coefficients used to combine the CSI-RS ports.

In some aspects, when the UE may select the virtual CSI-RS ports (e.g., SD-FD pairs) on virtual-port-group basis, the UE may transmit multiple signaling. Initially, the UE may transmit first signaling, which may indicate a selected virtual port group (i.e., SD-FD pair group). Subsequently, the UE may transmit second signaling, which may indicate one or more selected virtual CSI-RS ports (i.e., SD-FD pairs) from the selected virtual port group (e.g., SD-FD pair group). In some aspects, the UE may first indicate a CSI-RS port selection and then indicate a virtual port selection indicating selected virtual CSI-RS ports associated with the selected CSI-RS port.

Capability Indication:

In some aspects, the UE may send capability signaling to a BS. In one non-limiting example (mode 1), the capability signaling may indicate a capability of the UE to determine one-to-one mapping between CSI-RS port and virtual CSI-RS port (i.e., SD-FD bases pair) and to select CSI-RS ports across a plurality of CSI-RS resources (e.g., with a one-to-one mapping). In another non-limiting example (mode 2), the capability signaling may indicate a capability of the UE to determine many-to-one mapping between virtual CSI-RS ports and CSI-RS ports to select the CSI-RS ports from within a single CSI-RS resource (e.g., with a many-to-one mapping). In some cases, a network may configure a corresponding mode per UE capability reporting. In some cases, if the UE indicates supporting both the modes, the network may selectively configure one of the two modes to the UE.

Example Aspects

In a first aspect, a method for wireless communication by a user equipment (UE) includes selecting one or more channel state information reference signals (CSI-RS) ports, of a plurality of CSI-RS ports, for the UE to report CSI, wherein the port selection includes selecting any of the plurality of CSI-RS ports to report the CSI or selecting CSI-RS ports based on a grouping of the plurality of CSI-RS ports, determining a precoding matrix indicator (PMI) formed by a linear combination of the one or more selected CSI-RS ports; computing at least wideband linear combination coefficients for the selected CSI-RS ports; and providing the selected one or more CSI-RS ports and the computed wideband linear combination coefficients to a base station (BS) in a CSI report.

In a second aspect, alone or in combination with the first aspect, the wideband linear combination coefficients are computed across all frequency domain (FD) units for each selected CSI-RS port.

In a third aspect, alone or in combination with one or more of the first and second aspects, the port selection is polarization-specific or polarization-common.

In a fourth aspect, alone or in combination with one or more of the first through third aspects, selecting the one or more CSI-RS ports for the UE to report CSI includes determining the grouping of the plurality of CSI-RS ports; and selecting the one or more CSI-RS ports based, at least in part, on the grouping.

In a fifth aspect, alone or in combination with one or more of the first through fourth aspects, the UE determines the grouping of the plurality of CSI-RS ports by determining a first portion of the plurality of CSI-RS ports; and determining a second portion of the plurality of CSI-RS ports.

In a sixth aspect, alone or in combination with one or more of the first through fifth aspects, the first portion of the plurality of CSI-RS ports is associated with a first polarization; and the second portion of the plurality of CSI-RS is associated with a second polarization.

In a seventh aspect, alone or in combination with one or more of the first through sixth aspects, the UE determines the grouping of the plurality of CSI-RS ports by determining a first plurality of groups of the CSI-RS ports in a first portion; and determining a second plurality of groups of the CSI-RS ports in a second portion.

In an eighth aspect, alone or in combination with one or more of the first through seventh aspects, all the CSI-RS ports within a particular group of the first and second plurality of groups, is associated with a common particular spatial domain (SD) or frequency domain (FD) basis; and within each of the groups, each particular CSI-RS port is associated with a particular one of the other one of the SD or FD basis.

In a ninth aspect, alone or in combination with one or more of the first through eighth aspects, the UE receives a configuration from the BS of a number of CSI-RS port groups for the UE to report linear combination coefficients, wherein the selecting comprises selecting CSI-RS ports from up to the configured number of CSI-RS port groups.

In a tenth aspect, alone or in combination with one or more of the first through ninth aspects, the UE receives a configuration from the BS of a number of CSI-RS ports, within each CSI-RS port group, for the UE to report linear combination coefficients, wherein the selecting comprises selecting up to the configured number of CSI-RS ports from each of the selected CSI-RS port groups.

In an eleventh aspect, alone or in combination with one or more of the first through tenth aspects, the UE provides the selected one or more CSI-RS ports by indicating one or more CSI-RS port group index, one or more CSI-RS port index, or both.

In a twelfth aspect, alone or in combination with one or more of the first through eleventh aspects, the UE provides the selected one or more CSI-RS ports by providing one or more CSI-RS port group index for the first plurality of CSI-RS ports, wherein the one or more CSI-RS port group index for the second plurality of the CSI-RS ports is determined based on the one or more CSI-RS port group index for the first plurality of CSI-RS ports; and/or providing one or more CSI-RS port index for the first CSI-RS port group, wherein the one or more CSI-RS port index for the remaining one or more CSI-RS port group is determined based on the one or more CSI-RS port index for the first CSI-RS port group.

In a thirteenth aspect, alone or in combination with one or more of the first through twelfth aspects, the UE determines the grouping of the plurality of CSI-RS ports by determining a plurality of CSI-RS resources, each CSI-RS resource comprising first and second portions of the CSI-RS ports; and receiving a configuration from the BS of a number of CSI-RS resources for the UE to report linear combination coefficients, and the UE selects the CSI-RS ports from up to the configured number of CSI-RS resources.

In a fourteenth aspect, alone or in combination with one or more of the first through thirteenth aspects, all the CSI-RS ports within a particular CSI-RS resource is associated with a particular spatial domain (SD) or frequency domain (FD) basis; and within each CSI-RS resource: each particular CSI-RS port in the first portion of CSI-RS ports is associated with a particular one of the other one of the SD or FD basis; and each particular CSI-RS port in the second portion of CSI-RS ports is associated with the particular one of the other one of the SD or FD basis.

In a fifteenth aspect, alone or in combination with one or more of the first through fourteenth aspects, the UE receives a configuration from the BS of a number of CSI-RS ports, within each CSI-RS resource, for the UE to report linear combination coefficients, wherein the selecting comprises selecting up to configured number of CSI-RS ports from each of the selected CSI-RS resources.

In a sixteenth aspect, alone or in combination with one or more of the first through fifteenth aspects, the UE provides the selected one or more CSI-RS ports by indicating one or more CSI-RS resource index, one or more CSI-RS port index, or both, indicating the selected CSI-RS ports associated with the CSI report.

In a seventeenth aspect, alone or in combination with one or more of the first through sixteenth aspects, the UE provides the selected one or more CSI-RS ports by providing one or more CSI-RS resource index for the first plurality of CSI-RS ports, wherein the one or more CSI-RS resource index for the second plurality of the CSI-RS ports is determined based on the one or more CSI-RS resource index for the first plurality of CSI-RS ports; providing one or more CSI-RS port index for the first CSI-RS resource, wherein the one or more CSI-RS port index for the remaining one or more CSI-RS resources is determined based on the one or more CSI-RS port index for the first CSI-RS resource; and/or providing one or more CSI-RS port index for the first plurality of CSI-RS ports, wherein the one or more CSI-RS port index for the second plurality of the CSI-RS ports is determined based on the one or more CSI-RS port index for the first plurality of CSI-RS ports.

In an eighteenth aspect, alone or in combination with one or more of the first through seventeenth aspects, the UE receives a configuration from the BS of a maximum number of CSI-RS ports per-layer or per-rank for the UE to report linear combination coefficients.

In a nineteenth aspect, alone or in combination with one or more of the first through eighteenth aspects, the UE reports to the BS an indication of a number of non-zero CSI-RS ports, equal to or less than the configured maximum number of CSI-RS ports, associated with the CSI report.

In a twentieth aspect, alone or in combination with one or more of the first through nineteenth aspects, the UE reports to the BS an indication of the selected non-zero CSI-RS ports, equal to or less than the configured maximum number of CSI-RS ports, associated with the CSI report.

In a twenty-first aspect, alone or in combination with one or more of the first through twentieth aspects, the UE receives a configuration from the BS of a subset of the plurality of CSI-RS ports, wherein the selecting the one or more CSI-RS ports for the UE to report CSI comprises selecting CSI-RS ports from the configured subset of CSI-RS ports.

In a twenty-second aspect, alone or in combination with one or more of the first through twenty-first aspects, the subset is configured rank-specific.

In a twenty-third aspect, alone or in combination with one or more of the first through twenty-second aspects, the plurality of CSI-RS ports comprises more than 32 CSI-RS ports.

In a twenty-fourth aspect, alone or in combination with one or more of the first through twenty-first aspects, a frequency domain (FD) unit size is smaller than a subband.

In a twenty-fifth aspect, alone or in combination with the first aspect, selection of any of the plurality of CSI-RS ports for the UE to report the CSI comprises selecting any of the CSI-RS ports from across a plurality of CSI-RS resources, wherein each CSI-RS resource comprises multiple CSI-RS ports.

In a twenty-sixth aspect, alone or in combination with the twenty-fifth aspect, the UE determines a resource grouping or resource pairing from the plurality of CSI-RS resources, wherein selecting the CSI-RS ports is across the resources within a same resource grouping or within a same resource pairing.

In a twenty-seventh aspect, alone or in combination with one or more of the twenty-fifth aspect and twenty-sixth aspect, the UE determines that the resource grouping or resource pairing is based on receiving a configuration from the BS, based on an order of the CSI-RS resources, or a combination thereof.

In a twenty-eighth aspect, alone or in combination with one or more of the twenty-fifth through twenty-seventh aspects, the UE determines a preferred resource group or a preferred resource pair; and reports an indication of the preferred resource group or the preferred resource pair.

In a twenty-ninth aspect, alone or in combination with one or more of the twenty-fifth through twenty-eighth aspects, each CSI-RS port across a plurality of CSI-RS resources is associated with a pair of a spatial domain (SD) and frequency domain (FD) basis.

In a thirtieth aspect, alone or in combination with one or more of the twenty-fifth through twenty-ninth aspects, each CSI-RS resource is divided into at least two portions.

In a thirty-one aspect, alone or in combination with one or more of the twenty-fifth through thirtieth aspects, each CSI-RS resource is associated with a density corresponding to frequency resources available for CSI-RS.

In a thirty-two aspect, alone or in combination with one or more of the twenty-fifth through thirty-one aspects, the UE determines for each CSI-RS port across a plurality of CSI-RS resources, a virtual CSI-RS port index based on a CSI-RS resource index corresponding to a CSI-RS resource which comprises the CSI-RS port; determines that the PMI is mapped to the virtual CSI-RS port index; and/or calculates a channel quality indicator (CQI) based on the PMI and the virtual CSI-RS port index.

In a thirty-three aspect, alone or in combination with the first aspect, the selection of any of the plurality of CSI-RS ports for the UE to report the CSI comprises selecting any of the CSI-RS ports from within one of a plurality of combination CSI-RS resources, wherein each combination CSI-RS resource comprises one or more component CSI-RS resources, and wherein each component CSI-RS resource comprises multiple CSI-RS ports.

In a thirty-fourth aspect, alone or in combination with the thirty-three aspect, the UE receives one or more resource mapping configurations for each combination CSI-RS resource where each resource mapping configuration indicates a resource mapping for a respective CSI-RS component resource.

In a thirty-fifth aspect, alone or in combination with one or more of the thirty-three aspect and the thirty-fourh aspect, the UE determines indexes of the CSI-RS ports based on an order corresponding to the one or more resource mapping configurations.

In a thirty-sixth aspect, alone or in combination with one or more of the thirty-three through thirty-fifth aspects, a first component CSI-RS resource of the one or more component CSI-RS resources is transmitted on a first set of resource blocks (RBs), and a second component CSI-RS resource of the one or more component CSI-RS resources is transmitted on a second set of RBs, wherein the first and second set of RBs are same or different.

In a thirty-seventh aspect, alone or in combination with the first aspect, selection of any of the plurality of CSI-RS ports for the UE to report the CSI comprises selecting any of the CSI-RS ports from within one of a plurality of CSI-RS resources, wherein each CSI-RS resource comprises multiple CSI-RS ports and each port in each resource is mapped to multiple virtual CSI-RS ports.

In a thirty-eighth aspect, alone or in combination with the thirty-seventh aspect, each virtual CSI-RS port is associated with a pair of spatial domain (SD) and frequency domain (FD) bases.

In a thirty-ninth aspect, alone or in combination with one or more of the thirty-seventh aspect and the thirty-eighth aspect, the virtual CSI-RS ports in a same group are mapped to a same CSI-RS port.

In a fortieth aspect, alone or in combination with the one or more of the thirty-seventh through thirty-ninth aspects, the virtual CSI-RS ports mapped to a same CSI-RS port are transmitted on different resource blocks.

In a forty-one aspect, alone or in combination with one or more of the thirty-seventh through fortieth aspects, the virtual CSI-RS ports in a same group transmitted to a same set of resource blocks are mapped to different CSI-RS ports.

In a forty-two aspect, alone or in combination with one or more of the thirty-seventh through forty-one aspects, selection of any of the plurality of CSI-RS ports for the UE to report the CSI comprise selecting any one or more virtual CSI-RS ports.

In a forty-three aspect, alone or in combination with one or more of the thirty-seventh through forty-two aspects, the UE determines a virtual CSI-RS port index for the virtual CSI-RS ports based on their transmission on a set of resource blocks and a corresponding CSI-RS port index; determines that the PMI is mapped to the virtual CSI-RS port index; and/or calculates a channel quality indicator (CQI) based on the PMI and the virtual CSI-RS port index.

In a forty-fourth aspect, alone or in combination with one or more of the thirty-seventh through forty-three aspects, the UE transmits first signaling indicating a selected virtual CSI-RS port group; and second signaling indicating one or more selected virtual CSI-RS ports from within the selected virtual CSI-RS port group.

In a forty-fifth aspect, alone or in combination with the first aspect, the UE sends capability signaling indicating a capability of the UE to select virtual CSI-RS ports across CSI-RS resources, wherein each CSI-RS port of each CSI-RS resource corresponds to one virtual CSI-RS port; or from within a single CSI-RS resource, wherein each CSI-RS port in the CSI-RS resource corresponds to multiple virtual CSI-RS ports; or both.

In a forty-sixth aspect, alone or in combination with the first aspect, the UE receives a configuration indicating the UE to select virtual CSI-RS ports across CSI-RS resources, wherein each CSI-RS port of each CSI-RS resource corresponds to one virtual CSI-RS port, or from within a single CSI-RS resource wherein each CSI-RS port in the CSI-RS resource corresponds to multiple virtual CSI-RS ports.

In a forty-seventh aspect, a method for wireless communication by a base station (BS) includes transmitting a channel state information (CSI) request to a user equipment (UE) for a precoding matrix indicator (PMI) formed by linear combination of a plurality of CSI reference signal (CSI-RS) ports selected by the UE, wherein the port selection includes a selection from any of the plurality of CSI-RS ports or a selection of CSI-RS ports based on a grouping of the plurality of CSI-RS ports; and receiving a CSI report from the UE comprising at least the port selection and wideband linear combination coefficients.

In a forty-eight aspect, alone or in combination with the forty-seventh aspect, the port selection is polarization-specific or polarization-common.

In a forty-ninth aspect, alone or in combination with one or more of the forty-seventh and forty-eighth aspects, each precoder for the CSI-RS ports is a spatial precoder associated with a specific spatial domain (SD) basis and frequency domain (FD) basis to emulate the CSI-RS port; and different precoders are associated with different SD basis, different FD basis, or both.

In a fiftieth aspect, alone or in combination with one or more of the forty-seventh through forty-ninth aspects, the BS determines the grouping of the plurality of CSI-RS ports by: determining a first portion of the plurality of CSI-RS ports; and determining a second portion of the plurality of CSI-RS ports.

In a fifty-one aspect, alone or in combination with one or more of the forty-seventh through fiftieth aspects, the first portion of the plurality of CSI-RS ports is associated with a first polarization; and the second portion of the plurality of CSI-RS is associated with a second polarization.

In a fifty-two, alone or in combination with one or more of the forty-seventh through fifty-one aspects, the BS determines the grouping of the plurality of CSI-RS ports by: determining a first plurality of groups of the CSI-RS ports in the first portion; and determining a second plurality of groups of the CSI-RS ports in the second portion.

In a fifty-three aspect, alone or in combination with one or more of the forty-seventh through fifty-two aspects, the BS configures the UE with a number of the CSI-RS port groups for the UE to report linear combination coefficients.

In a fifty-fourth aspect, alone or in combination with one or more of the forty-seventh through fifty-three aspects, the BS configures the UE with a number of CSI-RS ports, within each CSI-RS port group, for the UE to report linear combination coefficients.

In a fifty-fifth aspect, alone or in combination with one or more of the forty-seventh through fifty-four aspects, the CSI report includes one or more CSI-RS port group index, one or more CSI-RS port index, or both, indicating CSI-RS ports associated with the CSI report.

In a fifty-sixth aspect, alone or in combination with one or more of the forty-seventh through fifty-fifth aspects, the CSI report includes one or more CSI-RS port group index for the first plurality of CSI-RS ports, wherein the one or more CSI-RS port group index for the second plurality of the CSI-RS ports is determined based on the one or more CSI-RS port group index for the first plurality of CSI-RS ports; and/or one or more CSI-RS port index for the first CSI-RS port group, wherein the one or more CSI-RS port index for the remaining one or more CSI-RS port group is determined based on the one or more CSI-RS port index for the first CSI-RS port group.

In a fifty-seventh aspect, alone or in combination with one or more of the forty-seventh through fifty-sixth aspects, all the CSI-RS ports within a particular group of the first and second plurality of groups, is associated with a common particular SD or FD basis; and within each of the groups, each particular CSI-RS port is associated with a particular one of the other one of the SD or FD basis.

In a fifty-eighth aspect, alone or in combination with one or more of the forty-seventh through fifty-seventh aspects, the BS determines the grouping of the CSI-RS ports by:

determining a plurality of CSI-RS resources, each CSI-RS resource comprising the first and second portions of the CSI-RS ports.

In a fifty-ninth aspect, alone or in combination with one or more of the forty-seventh through fifty-eighth aspects, the BS configures the UE with a number of the CSI-RS resources for the UE to report linear combination coefficients.

In a sixtieth aspect, alone or in combination with one or more of the forty-seventh through fifty-ninth aspects, the BS configures the UE with a number of CSI-RS ports, within each CSI-RS resource, for the UE to report linear combination coefficients.

In a sixty-one aspect, alone or in combination with one or more of the forty-seventh through sixtieth aspects, the CSI report includes one or more resource index, one or more CSI-RS port index, or both, indicating CSI-RS ports associated with the CSI report.

In a sixty-two aspect, alone or in combination with one or more of the forty-seventh through sixty-one aspects, the CSI report includes one or more CSI-RS resource index for the first plurality of CSI-RS ports, wherein the one or more CSI-RS resource index for the second plurality of the CSI-RS ports is determined based on the one or more CSI-RS resource index for the first plurality of CSI-RS ports; one or more CSI-RS port index for the first CSI-RS resource, wherein the one or more CSI-RS port index for the remaining one or more CSI-RS resources is determined based on the one or more CSI-RS port index for the first CSI-RS resource; and/or one or more CSI-RS port index for the first plurality of CSI-RS ports, wherein the one or more CSI-RS port index for the second plurality of the CSI-RS ports is determined based on the one or more CSI-RS port index for the first plurality of CSI-RS ports.

In a sixty-three aspect, alone or in combination with one or more of the forty-seventh through sixty-two aspects, each resource is associated with a particular SD or FD basis; and within each resource: each particular CSI-RS port in the first portion of CSI-RS ports is associated with a particular one of the other one of the SD or FD basis; and each particular CSI-RS port in the second portion of CSI-RS ports is associated with the particular one of the other one of the SD or FD basis.

In a sixty-fourth aspect, alone or in combination with one or more of the forty-seventh through sixty-three aspects, the BS configures the UE with a maximum number of CSI-RS ports per-layer or per-rank for the UE to report linear combination coefficients.

In a sixty-fifth aspect, alone or in combination with one or more of the forty-seventh through sixty-four aspects, the CSI report includes an indication of a number of non-zero CSI-RS ports, equal to or less than the configured maximum number of CSI-RS ports, associated with the CSI report.

In a sixty-sixth aspect, alone or in combination with one or more of the forty-seventh through sixty-five aspects, the CSI report includes an indication of the selected non-zero CSI-RS ports, equal to or less than the configured maximum number of CSI-RS ports, associated with the CSI report.

In a sixty-seventh aspect, alone or in combination with one or more of the forty-seventh through sixty-six aspects, the BS configures the UE with a subset of the plurality of CSI-RS ports from which the UE can select up to the maximum number of CSI-RS ports per-layer.

In a sixty-eighth aspect, alone or in combination with one or more of the forty-seventh through sixty-seven aspects, the subset is configured rank-specific.

In a sixty-ninth aspect, alone or in combination with one or more of the forty-seventh through sixty-eighth aspects, the plurality of CSI-RS ports includes more than 32 CSI-RS ports.

In a seventieth aspect, alone or in combination with one or more of the forty-seventh through sixty-ninth aspects, a frequency domain (FD) unit size is smaller than a subband.

In a seventy-one aspect, alone or in combination with the forty-seventh aspect, the selection of the plurality of CSI-RS ports comprises selecting any of the CSI-RS ports from across a plurality of CSI-RS resources, wherein each CSI-RS resource comprises multiple CSI-RS ports and is mapped to a virtual CSI-RS port.

In a seventy-two aspect, alone or in combination with the seventy-one aspect, the BS determines a resource grouping or resource pairing from the plurality of CSI-RS resources, wherein selecting the CSI-RS ports is across the resources within a same resource grouping or within a same resource pairing.

In a seventy-three aspect, alone or in combination with the seventy-one aspect, the BS determines the resource grouping or resource pairing based on receiving a configuration, based on an order of the CSI-RS resources, or a combination thereof.

In a seventy-fourth aspect, alone or in combination with the seventy-one aspect, the BS determines a preferred resource group or a preferred resource pair; and receives an indication from the UE of a preferred resource group or a preferred resource pair.

In a seventy-fifth aspect, alone or in combination with the seventy-one aspect, the virtual CSI-RS port is associated with a pair of a spatial domain (SD) and frequency domain (FD) basis.

In a seventy-sixth aspect, alone or in combination with the seventy-one aspect, each CSI-RS resource is divided into at least two portions.

In a seventy-seventh aspect, alone or in combination with one or more of the seventy-one to seventh-fifth aspects, each CSI-RS resource is associated with a density corresponding to frequency resources available for CSI-RS.

In a seventy-eighth aspect, alone or in combination with the forty-seventh aspect, the selection of the plurality of CSI-RS ports comprises selecting any of the CSI-RS ports from within one of a plurality of CSI-RS resources, wherein each CSI-RS resource comprises multiple CSI-RS ports and is mapped to multiple virtual CSI-RS ports.

In a seventy-ninth aspect, alone or in combination with the seventy-eighth aspect, each virtual CSI-RS port is associated with a pair of spatial domain (SD) and frequency domain (FD) bases.

In an eightieth aspect, alone or in combination with the seventy-ninth aspect, the virtual CSI-RS ports in a same group are mapped to a same CSI-RS port.

In an eighty-one aspect, alone or in combination with the eightieth aspect, the virtual CSI-RS ports mapped to the same CSI-RS port are transmitted on different resource blocks.

In an eighty-two aspect, alone or in combination with the seventy-eighth aspect, the virtual CSI-RS ports in a same group transmitted to a same set of resource blocks are mapped to different CSI-RS ports.

In an eighty-three aspect, alone or in combination with the seventy-eighth aspect, the selection of the plurality of CSI-RS ports comprises selecting any one or more virtual CSI-RS ports.

In an eighty-four aspect, alone or in combination with the eighty-three aspect, the BS receives first signaling from the UE indicating a selected virtual CSI-RS port group; and second signaling from the UE indicating one or more selected virtual CSI-RS ports from within the selected virtual CSI-RS port group.

In an eighty-fifth aspect, alone or in combination with the forty-seventh aspect, the BS receives capability signaling from the UE indicating a capability of the UE to select virtual CSI-RS ports across CSI-RS resources, wherein each CSI-RS port of each CSI-RS resource corresponds to one virtual CSI-RS port; or from within a single CSI-RS resource, wherein each CSI-RS port in the CSI-RS resource corresponds to multiple virtual CSI-RS ports; or both.

In an eighty-sixth aspect, alone or in combination with the forty-seventh aspect, the BS sends a configuration to the UE indicating the UE to select virtual CSI-RS ports across CSI-RS resources, wherein each CSI-RS port of each CSI-RS resource corresponds to one virtual CSI-RS port, or from within a single CSI-RS resource wherein each CSI-RS port in the CSI-RS resource corresponds to multiple virtual CSI-RS ports.

In an eighty-seventh aspect, alone or in combination with the forty-seventh aspect, the selection of the plurality of CSI-RS ports for the UE to report the CSI comprises selecting any of the CSI-RS ports from within one of a plurality of combination CSI-RS resources, wherein each combination CSI-RS resource comprises one or more component CSI-RS resources, and wherein each component CSI-RS resource comprises multiple CSI-RS ports.

In an eighty-eighth aspect, alone or in combination with the eighty-seventh aspect, the BS sends one or more resource mapping configurations for each combination CSI-RS resource, wherein each resource mapping configuration indicates a resource mapping for a respective CSI-RS component resource.

In an eighty-ninth aspect, alone or in combination with the eighty-eighth aspect, indexes of the CSI-RS ports are determined based on an order corresponding to the one or more resource mapping configurations.

In a ninetieth aspect, alone or in combination with the eighty-seventh aspect, a first component CSI-RS resource of the one or more component CSI-RS resources is transmitted on a first set of resource blocks (RBs), and a second component CSI-RS resource of the one or more component CSI-RS resources is transmitted on a second set of RBs, wherein the first and second set of RBs are same or different.

In a ninety-one aspect, an apparatus for wireless communication comprises a memory; and at least one processor coupled with the memory and configured to: select one or more channel state information reference signals (CSI-RS) ports, of a plurality of CSI-RS ports, for the apparatus to report CSI, wherein the port selection comprises: selecting any of the plurality of CSI-RS ports to report the CSI; or selecting CSI-RS ports based on a grouping of the plurality of CSI-RS ports; determine a precoding matrix indicator (PMI) formed by a linear combination of the one or more selected CSI-RS ports; compute at least wideband linear combination coefficients for the selected CSI-RS ports; and provide the selected one or more CSI-RS ports and the computed wideband linear combination coefficients to a base station (BS) in a CSI report.

In a ninety-two aspect, an apparatus for wireless communication comprises a memory; and at least one processor coupled with the memory and configured to: transmit a channel state information (CSI) request to a user equipment (UE) for a precoding matrix indicator (PMI) formed by linear combination of a plurality of CSI reference signal (CSI-RS) ports selected by the UE, wherein the port selection comprises: a selection from any of the plurality of CSI-RS ports; or a selection of CSI-RS ports based on a grouping of the plurality of CSI-RS ports; and receive a CSI report form the UE comprising at least the port selection and wideband linear combination coefficients.

In a ninety-three aspect, an apparatus for wireless communication comprises means for selecting one or more channel state information reference signals (CSI-RS) ports, of a plurality of CSI-RS ports, for the apparatus to report CSI, wherein the port selection comprises: selecting any of the plurality of CSI-RS ports to report the CSI; or selecting CSI-RS ports based on a grouping of the plurality of CSI-RS ports; means for determining a precoding matrix indicator (PMI) formed by a linear combination of the one or more selected CSI-RS ports; means for computing at least wideband linear combination coefficients for the selected CSI-RS ports; and means for providing the selected one or more CSI-RS ports and the computed wideband linear combination coefficients to a base station (BS) in a CSI report.

In a ninety-fourth aspect, an apparatus for wireless communication comprises means for transmitting a channel state information (CSI) request to a user equipment (UE) for a precoding matrix indicator (PMI) formed by linear combination of a plurality of CSI reference signal (CSI-RS) ports selected by the UE, wherein the port selection comprises: a selection from any of the plurality of CSI-RS ports; or a selection of CSI-RS ports based on a grouping of the plurality of CSI-RS ports; and means for receiving a CSI report form the UE comprising at least the port selection and wideband linear combination coefficients.

In a ninety-fifth aspect, a computer readable medium storing computer executable code thereon for wireless communication comprises code for selecting one or more channel state information reference signals (CSI-RS) ports, of a plurality of CSI-RS ports, for a user equipment (UE) to report CSI, wherein the port selection comprises: selecting any of the plurality of CSI-RS ports to report the CSI; or selecting CSI-RS ports based on a grouping of the plurality of CSI-RS ports; code for determining a precoding matrix indicator (PMI) formed by a linear combination of the one or more selected CSI-RS ports; code for computing at least wideband linear combination coefficients for the selected CSI-RS ports; and code for providing the selected one or more CSI-RS ports and the computed wideband linear combination coefficients to a base station (BS) in a CSI report.

In a ninety-sixth aspect, a computer readable medium storing computer executable code thereon for wireless communication comprises code for transmitting a channel state information (CSI) request to a user equipment (UE) for a precoding matrix indicator (PMI) formed by linear combination of a plurality of CSI reference signal (CSI-RS) ports selected by the UE, wherein the port selection comprises: a selection from any of the plurality of CSI-RS ports; or a selection of CSI-RS ports based on a grouping of the plurality of CSI-RS ports; and code for receiving a CSI report form the UE comprising at least the port selection and wideband linear combination coefficients.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3$^{rd}$ Generation Partnership Project" (3GPP). cdma2000 and UMB are described in documents from an organization named "3$^{rd}$ Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 7 and/or FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), the method comprising:
   selecting one or more channel state information reference signals (CSI-RS) ports, of a plurality of CSI-RS ports, for the UE to report CSI, wherein the selecting the one or more CSI-RS ports comprises:
      selecting any one or more of the plurality of CSI-RS ports for the UE to report the CSI; or
      selecting the one or more CSI-RS ports based on a grouping of the plurality of CSI-RS ports;
   determining a precoding matrix indicator (PMI) formed by a linear combination of the selected one or more CSI-RS ports;
   computing at least wideband linear combination coefficients for the selected one or more CSI-RS ports; and
   providing the selected one or more CSI-RS ports and the computed wideband linear combination coefficients to a base station (BS) in a CSI report.

2. The method of claim 1, wherein computing the wideband linear combination coefficients is across all frequency domain (FD) units for each of the selected one or more CSI-RS ports.

3. The method of claim 1, wherein the selecting the one or more CSI-RS ports is polarization-specific or polarization-common.

4. The method of claim 1, wherein the selecting the one or more CSI-RS ports comprises:
   determining the grouping of the plurality of CSI-RS ports; and
   selecting the one or more CSI-RS ports based, at least in part, on the grouping.

5. The method of claim 4, wherein the determining the grouping of the plurality of CSI-RS ports comprises:
   determining a first portion of the plurality of CSI-RS ports; and
   determining a second portion of the plurality of CSI-RS ports.

6. The method of claim 5, wherein:
   the first portion of the plurality of CSI-RS ports is associated with a first polarization; and
   the second portion of the plurality of CSI-RS is associated with a second polarization.

7. The method of claim 4, wherein the determining the grouping of the plurality of CSI-RS ports comprises:
   determining a first plurality of groups of the plurality of CSI-RS ports in a first portion; and
   determining a second plurality of groups of the plurality of CSI-RS ports in a second portion.

8. The method of claim 7, wherein:
   all the CSI-RS ports within a particular group of the first plurality of groups and the second plurality of groups, is associated with a common particular spatial domain (SD) basis or a common particular frequency domain (FD) basis; and
   within each of the first plurality of groups and the second plurality of groups, each particular CSI-RS port is associated with a particular one of the other one of the SD basis or the FD basis.

9. The method of claim 7, further comprising receiving a configuration from the BS of a number of CSI-RS port groups for the UE to report linear combination coefficients, wherein the selecting comprises selecting the one or more CSI-RS ports from up to the configured number of CSI-RS port groups.

10. The method of claim 4, wherein the determining the grouping of the plurality of CSI-RS ports comprises:
    determining a plurality of CSI-RS resources, each CSI-RS resource of the plurality of CSI-RS resources comprising a first portion of the CSI-RS reports and a second portion of the CSI-RS ports; and
    receiving a configuration from the BS of a number of CSI-RS resources for the UE to report linear combination coefficients, wherein
    the selecting comprises selecting the one or more CSI-RS ports from up to the configured number of CSI-RS resources.

11. The method of claim 1, further comprising receiving a configuration from the BS of a maximum number of CSI-RS ports per-layer or per-rank for the UE to report linear combination coefficients.

12. The method of claim 1, wherein the selecting any of the plurality of CSI-RS ports for the UE to report the CSI comprises selecting the any of the CSI-RS ports from across a plurality of CSI-RS resources, wherein each CSI-RS resource of the plurality of CSI-RS resources comprises multiple CSI-RS ports.

13. The method of claim 1, wherein the selecting any of the plurality of CSI-RS ports for the UE to report the CSI comprises selecting the any of the CSI-RS ports from within one of a plurality of combined CSI-RS resources, wherein each combined CSI-RS resource of the plurality of combined CSI-RS resources comprises one or more component CSI-RS resources, and wherein each component CSI-RS resource of the one or more components CSI-RS resources comprises multiple CSI-RS ports.

14. The method of claim 1, wherein the selecting any of the plurality of CSI-RS ports for the UE to report the CSI comprises selecting the any of the CSI-RS ports from within one of a plurality of CSI-RS resources, wherein each CSI-RS resource of the plurality of CSI-RS resources comprises multiple CSI-RS ports, and wherein each CSI-RS port in each CSI-RS resource of the plurality of CSI-RS resources is mapped to multiple virtual CSI-RS ports.

15. The method of claim 1, further comprising sending capability signaling indicating a capability of the UE to select virtual CSI-RS ports:
across CSI-RS resources, wherein each CSI-RS port of each CSI-RS resource corresponds to one virtual CSI-RS port;
from within a single CSI-RS resource, wherein each CSI-RS port in the CSI-RS resource corresponds to multiple virtual CSI-RS ports; or
both.

16. The method of claim 1, further comprising receiving a configuration indicating the UE to select virtual CSI-RS ports:
across CSI-RS resources, wherein each CSI-RS port of each CSI-RS resource corresponds to one virtual CSI-RS port, or
from within a single CSI-RS resource, wherein each CSI-RS port in the CSI-RS resource corresponds to multiple virtual CSI-RS ports.

17. A method for wireless communication by a base station (BS), the method comprising:
transmitting a channel state information (CSI) request to a user equipment (UE) for a precoding matrix indicator (PMI) formed by linear combination of one or more CSI-RS ports, of a plurality of CSI reference signal (CSI-RS) ports, selected by the UE, wherein the one or more CSI-RS ports comprise:
one or more CSI-RS ports from any of the plurality of CSI-RS ports; or
one or more CSI-RS ports based on a grouping of the plurality of CSI-RS ports; and
receiving a CSI report from the UE comprising at least the one or more CSI-RS ports selected by the UE and wideband linear combination coefficients.

18. The method of claim 17, wherein the one or more CSI-RS ports are polarization-specific or polarization-common.

19. The method of claim 17, wherein:
each precoder for the one or more CSI-RS ports is a spatial precoder associated with a specific spatial domain (SD) basis and a specific frequency domain (FD) basis to emulate the CSI-RS port; and
different precoders are associated with different SD basis, different FD basis, or both.

20. The method of claim 17, further comprising determining the grouping of the plurality of CSI-RS ports by:
determining a first portion of the plurality of CSI-RS ports; and
determining a second portion of the plurality of CSI-RS ports.

21. The method of claim 20, wherein:
the first portion of the plurality of CSI-RS ports is associated with a first polarization; and
the second portion of the plurality of CSI-RS is associated with a second polarization.

22. The method of claim 20, wherein the determining the grouping of the plurality of CSI-RS ports comprises:
determining a first plurality of groups of the CSI-RS ports in the first portion; and
determining a second plurality of groups of the CSI-RS ports in the second portion.

23. An apparatus for wireless communication, the apparatus comprising:
memory storing computer-executable code; and
one or more processors coupled with the memory and configured to, individually or collectively, execute the computer-executable code and cause the apparatus to:
select one or more channel state information reference signals (CSI-RS) ports, of a plurality of CSI-RS ports, for the apparatus to report CSI, wherein the selection of the one or more CSI-RS ports comprises:
a selection of any one or more of the plurality of CSI-RS ports for the apparatus to report the CSI; or
a selection of the one or more CSI-RS ports based on a grouping of the plurality of CSI-RS ports;
determine a precoding matrix indicator (PMI) formed by a linear combination of the selected one or more CSI-RS ports;
compute at least wideband linear combination coefficients for the selected one or more CSI-RS ports; and
provide the selected one or more CSI-RS ports and the computed wideband linear combination coefficients to a base station (BS) in a CSI report.

24. An apparatus for wireless communication, the apparatus comprising:
memory storing computer-executable code; and
one or more processors coupled with the memory and configured to, individually or collectively, execute the computer-executable code and cause the apparatus to:
transmit a channel state information (CSI) request to a user equipment (UE) for a precoding matrix indicator (PMI) formed by linear combination of one or more CSI-RS ports, of a plurality of CSI reference signal (CSI-RS) ports, selected by the UE, wherein the one or more CSI-RS ports comprise:
one or more CSI-RS ports from any of the plurality of CSI-RS ports; or
one or more CSI-RS ports based on a grouping of the plurality of CSI-RS ports; and
receive a CSI report from the UE comprising at least the one or more CSI-RS ports selected by the UE and wideband linear combination coefficients.

25. An apparatus for wireless communication, the apparatus comprising:
means for selecting one or more channel state information reference signals (CSI-RS) ports, of a plurality of CSI-RS ports, for the apparatus to report CSI, wherein the means for selecting the one or more CSI-RS ports comprises:
means for selecting any one or more of the plurality of CSI-RS ports for the apparatus to report the CSI; or
means for selecting the one or more CSI-RS ports based on a grouping of the plurality of CSI-RS ports;
means for determining a precoding matrix indicator (PMI) formed by a linear combination of the selected one or more CSI-RS ports;
means for computing at least wideband linear combination coefficients for the selected one or more CSI-RS ports; and means for providing the selected one or more CSI-RS ports and the computed wideband linear combination coefficients to a base station (BS) in a CSI report.

26. The apparatus of claim 23, wherein the one or more processors are configured to, individually or collectively, cause the apparatus to compute the wideband linear combination coefficients across all frequency domain (FD) units for each of the selected one or more CSI-RS ports.

27. The apparatus of claim 23, wherein the one or more processors are configured to, individually or collectively, cause the apparatus to select the one or more CSI-RS ports polarization-specific or polarization-common.

28. The apparatus of claim 23, wherein the one or more processors are configured to, individually or collectively, cause the apparatus to:
determine the grouping of the plurality of CSI-RS ports; and
select the one or more CSI-RS ports based, at least in part, on the grouping.

29. The apparatus of claim 28, wherein the of the one or more processors are configured to, individually or collectively, cause the apparatus to:
determine a first portion of the plurality of CSI-RS ports; and
determine a second portion of the plurality of CSI-RS ports.

30. The apparatus of claim 29, wherein:
the first portion of the plurality of CSI-RS ports is associated with a first polarization; and
the second portion of the plurality of CSI-RS is associated with a second polarization.

31. The apparatus of claim 28, wherein the the one or more processors are configured to, individually or collectively, cause the apparatus to:

determine a first plurality of groups of the plurality of CSI-RS ports in a first portion; and
determine a second plurality of groups of the plurality of CSI-RS ports in a second portion.

32. The apparatus of claim 31, wherein:
all the CSI-RS ports within a particular group of the first plurality of groups and the second plurality of groups, is associated with a common particular spatial domain (SD) basis or a common particular frequency domain (FD) basis; and
within each of the first plurality of groups and the second plurality of groups, each particular CSI-RS port is associated with a particular one of the other one of the SD basis or the FD basis.

33. The apparatus of claim 31, wherein the one or more processors further configured to, individually or collectively, cause the apparatus to:
receive a configuration from the BS of a number of CSI-RS port groups for the apparatus to report linear combination coefficients; and
select the one or more CSI-RS ports from up to the configured number of CSI-RS port groups.

34. The apparatus of claim 24, wherein the one or more CSI-RS ports are polarization-specific or polarization-common.

35. The apparatus of claim 24, wherein:
each precoder for the one or more CSI-RS ports is a spatial precoder associated with a specific spatial domain (SD) basis and a specific frequency domain (FD) basis to emulate the CSI-RS port; and
different precoders are associated with different SD basis, different FD basis, or both.

* * * * *